(12) United States Patent
Chen et al.

(10) Patent No.: US 11,729,266 B2
(45) Date of Patent: Aug. 15, 2023

(54) METHOD AND DEVICE FOR PREVENTING DATA MISDELETION, STORAGE MEDIUM, AND PRODUCT

(71) Applicant: Petal Cloud Technology Co., Ltd., Guangdong Province (CN)

(72) Inventors: Xiaoyang Chen, Nanjing (CN); Zhenfang Ji, Nanjing (CN); Wangbao Cao, Nanjing (CN); Hai Zhou, Nanjing (CN); Fen Yang, Nanjing (CN)

(73) Assignee: PETAL CLOUD TECHNOLOGY CO., LTD., Guangdong Province (CN)

( * ) Notice: Subject to any disclaimer, the term of this patent is extended or adjusted under 35 U.S.C. 154(b) by 0 days.

(21) Appl. No.: 17/787,459

(22) PCT Filed: Oct. 30, 2020

(86) PCT No.: PCT/CN2020/125587
§ 371 (c)(1),
(2) Date: Jun. 20, 2022

(87) PCT Pub. No.: WO2021/120893
PCT Pub. Date: Jun. 24, 2021

(65) Prior Publication Data
US 2023/0026777 A1    Jan. 26, 2023

(30) Foreign Application Priority Data
Dec. 18, 2019   (CN) .......................... 201911311450.1

(51) Int. Cl.
*H04L 67/1095*       (2022.01)
*H04L 65/40*       (2022.01)

(52) U.S. Cl.
CPC .......... *H04L 67/1095* (2013.01); *H04L 65/40* (2013.01)

(58) Field of Classification Search
None
See application file for complete search history.

(56) References Cited

U.S. PATENT DOCUMENTS 6,532,584 B1    3/2003  Nishida et al.
9,173,136 B2 *  10/2015  Macalet ............ H04W 36/0022
9,178,972 B2 *  11/2015  Swanburg ......... H04M 3/42068
(Continued)

FOREIGN PATENT DOCUMENTS

CN    102611646 A    7/2012
CN    102694812 A    9/2012
(Continued)

OTHER PUBLICATIONS

Cai et al., "Privacy-Protected Deletable Blockchain", Feb. 28, 2020, IEEE, IEEE Access (vol. 8, pp. 6060-6070) (Year: 2020).*
(Continued)

*Primary Examiner* — Davoud A Zand
(74) *Attorney, Agent, or Firm* — Conley Rose, P.C.

(57) ABSTRACT

A method for preventing data misdeletion includes: each of an Internet of Things (IoT) terminal and a user terminal is provided with a misdeletion prevention switch; and when a user opens the misdeletion prevention switch of the user terminal, the misdeletion prevention switch of the IoT terminal is synchronously opened, and when a server obtains a deletion request generated by the server, the server does not respond to the deletion request.

20 Claims, 10 Drawing Sheets

(56) References Cited

U.S. PATENT DOCUMENTS

| | | | |
|---|---|---|---|
| 2004/0153431 | A1 | 8/2004 | Bhogal et al. |
| 2010/0007713 | A1* | 1/2010 | Yamamoto ............. H04N 7/152 |
| | | | 348/E7.083 |
| 2014/0026182 | A1 | 1/2014 | Pearl et al. |
| 2017/0200122 | A1* | 7/2017 | Edson ................... H04L 63/104 |
| 2018/0248803 | A1* | 8/2018 | Nagarajan ............... H04L 12/46 |
| 2018/0343554 | A1 | 11/2018 | Ouzieli et al. |
| 2019/0165891 | A1 | 5/2019 | Iwai et al. |
| 2019/0334869 | A1 | 10/2019 | Grant |

FOREIGN PATENT DOCUMENTS

| | | |
|---|---|---|
| CN | 103874051 A | 6/2014 |
| CN | 105407146 A | 3/2016 |
| CN | 105955847 A | 9/2016 |
| CN | 107609027 A | 1/2018 |
| CN | 109191718 A | 1/2019 |
| CN | 109495539 A | 3/2019 |
| CN | 109768969 A | 5/2019 |

OTHER PUBLICATIONS

Phuong, T., et al., "Puncturable Attribute-Based Encryption for Secure Data Delivery in Internet of Things," IEEE INFOCOM 2018—IEEE Conference on Computer Communications, 2018, 9 pages.

Liya, L., et al., "Data synchronization algorithm controlled by the intelligent terminal," Journal of Xidian University, vol. 40, No. 2, Apr. 2013, 10 pages.

\* cited by examiner

METHOD AND DEVICE FOR PREVENTING DATA MISDELETION, STORAGE MEDIUM, AND PRODUCT

CROSS-REFERENCE TO RELATED APPLICATIONS

This is a U.S. National Stage of International Patent Application No. PCT/CN2020/125587 filed on Oct. 30, 2020, which claims priority to Chinese Patent Application No. 201911311450.1 filed on Dec. 18, 2019. Both of the aforementioned applications are hereby incorporated by reference in their entireties.

TECHNICAL FIELD

This application belongs to the field of communications technologies, and in particular, to a method and a device for preventing data misdeletion, a storage medium, and a program product.

BACKGROUND

With development of the Internet of Things (Internet of things, IoT), IoT terminals (such as smart speakers, smart switches, and smart sockets) have extended to thousands of households. A user may connect an IoT terminal to a server corresponding to an IoT cloud platform by using an application (Application, APP) on a user terminal (for example, a mobile phone or tablet computer). After the IoT terminal is connected to the server corresponding to the IoT cloud platform, the IoT terminal may implement interconnection and interworking with other IoT terminals. The user can view data about the IoT terminal in real time and remotely control the IoT terminal through the app.

However, when a deletion request is mistakenly triggered due to a user misoperation, a server exception, or firmware upgrade of the IoT terminal, the IoT terminal is triggered to clear local data. After clearing the local data, the IoT terminal cannot be connected to the server, and therefore reliability of the IoT system is low.

SUMMARY

Embodiments of this application provide a method and a device for preventing data misdeletion, a storage medium, and a program product, to resolve a problem in the current technology that an IoT terminal is triggered to clear local data when a deletion request is mistakenly triggered, and therefore the IoT terminal cannot connect to a server.

According to a first aspect, an embodiment of this application provides a method for preventing data misdeletion, applied to a server. The method for preventing data misdeletion includes:

obtaining a synchronization request sent by a user terminal, where the synchronization request is sent by the user terminal to the server when the user terminal detects that a misdeletion prevention switch of the user terminal is opened by a user, and is used to request an IoT terminal to synchronously open a misdeletion prevention switch of the IoT terminal;

indicating, in response to the synchronization request, the IoT terminal to synchronously open the misdeletion prevention switch of the IoT terminal;

obtaining a deletion request generated by the server, where the deletion request is used to request the server to delete data of the IoT terminal; and refusing to respond to the deletion request based on synchronously opening the misdeletion prevention switch of the IoT terminal based on the synchronization request of the user terminal.

The IoT terminal is a smart home device that can access the Internet, for example, a smart desk lamp, a smart socket, a smart switch, a gateway, a door and window sensor, a curtain controller, a temperature and humidity sensor, a smart sound box, and a smart sweeper. The IoT terminal stores a domain name of the server before delivery.

Each of the misdeletion prevention switch of the IoT terminal and the misdeletion prevention switch of the user terminal may be a physical switch, or may be a virtual switch set in a user interface (User Interface, UI). This is not limited herein.

Before the refusing to respond to the deletion request, it may be further determined that the misdeletion prevention switch of the IoT terminal is opened.

In this embodiment of this application, a misdeletion prevention switch is set on the IoT terminal, and a misdeletion prevention switch is set on the user terminal. When the user opens the misdeletion prevention switch of the user terminal, the misdeletion prevention switch of the IoT terminal is synchronously opened. When the server obtains the deletion request, the server refuses to respond to the deletion request and refuses to deliver the deletion request to the corresponding IoT terminal based on a premise that the misdeletion prevention switch of the IoT terminal is synchronously opened based on the synchronization request of the user terminal. In this manner, even if the server triggers the deletion request, the server does not clear related data of the IoT terminal, and does not deliver the deletion request. This can prevent the related data of the IoT terminal from being mistakenly deleted, and prevent the IoT terminal from being mistakenly deleted from an Internet of Things that the IoT terminal has accessed. When the server recovers to a normal operating state, the server can still obtain real-time data of the IoT terminal in real time.

In a possible implementation of the first aspect, the misdeletion prevention switch of the user terminal is displayed in a user interface UI of the user terminal. It may be understood that one or more misdeletion prevention switches may be displayed in the UI. When one misdeletion prevention switch is displayed in the UI, all IoT terminals under a same user account may be controlled. When a plurality of misdeletion prevention switches are displayed in the UI, the misdeletion prevention switches correspond to the IoT terminals, and one misdeletion prevention switch controls one IoT terminal.

In a possible implementation of the first aspect, the misdeletion prevention switch of the user terminal corresponds to the IoT terminal. In this case, the misdeletion prevention switch may be displayed in a setting interface that corresponds to the IoT terminal corresponding to the misdeletion prevention switch.

In a possible implementation of the first aspect, the misdeletion prevention switch of the IoT terminal is a physical switch.

In a possible implementation of the first aspect, the deletion request is generated when the server operates in an abnormal state. The abnormal state may be that a database of the server breaks down, or the server cannot obtain information about an IoT device in an IoT system. When the misdeletion prevention switch of the IoT terminal is in an opened state, when the server operates in the abnormal state, the server does not delete the data of the IoT terminal even if the server generates the deletion request. After the server recovers to the normal operating state, the IoT terminal can still communicate normally with the server.

In a possible implementation of the first aspect, the deleting the data of the IoT terminal includes deleting the IoT terminal from the Internet of Things that the IoT terminal has accessed.

Data stored in the IoT terminal is deleted. The data stored in the IoT terminal includes data used for establishing a communication connection between the IoT terminal and the server. After the IoT terminal deletes the data, the IoT terminal cannot establish the communication connection to the server.

In a possible implementation of the first aspect, after the indicating, in response to the synchronization request, the IoT terminal to synchronously open the misdeletion prevention switch of the IoT terminal, the method further includes:

recording status information of the misdeletion prevention switch of the IoT terminal.

The status information may be recorded by using deletion protection identifier information, or may be recorded by using a deletion protection field.

For example, to conveniently manage status information of the misdeletion prevention switch of each IoT terminal and improve efficiency of searching for the status information of the misdeletion prevention switch, the server may establish a data storage table used to store the related data of the IoT terminal, and add the deletion protection field to the data storage table. The deletion protection field, for example, a deletion guard field, is used to fill in the status information of the misdeletion prevention switch of the IoT terminal. When the misdeletion prevention switch of the IoT terminal is in an opened state, a value of the field is set to "true" or "1", which indicates that the IoT terminal is in a misdeletion protection state, and the server refuses to deliver the deletion request to the IoT terminal. When the misdeletion prevention switch of the IoT terminal is in a closed state, the value of the field is set to "false" or "0", which indicates that the IoT terminal is not in the misdeletion protection state. When the IoT terminal is not in the misdeletion protection state, the server may deliver the deletion request to the IoT terminal.

In a possible implementation of the first aspect, before the refusing to respond to the deletion request, it may be further determined that the misdeletion prevention switch of the terminal is opened.

In a possible implementation of the first aspect, after the recording status information of the misdeletion prevention switch of the IoT terminal, and before the refusing to respond to the deletion request, the method further includes: determining, based on the status information, that the misdeletion prevention switch of the IoT terminal is opened.

In a possible implementation of the first aspect, when the status information is recorded by using the deletion protection identifier information, the determining, based on the status information, that the misdeletion prevention switch of the IoT terminal is opened includes: determining, based on the deletion protection identifier information, that the misdeletion prevention switch of the IoT terminal is opened.

In a possible implementation of the first aspect, when the status information is recorded by using the deletion protection field, the determining, based on the status information, that the misdeletion prevention switch of the IoT terminal is opened includes:

determining, based on the deletion protection field, that the misdeletion prevention switch of the IoT terminal is opened.

In a possible implementation of the first aspect, after the recording status information of the misdeletion prevention switch of the IoT terminal, the method further includes:

updating the recorded status information based on status information of the misdeletion prevention switch reported by the IoT terminal.

If the status information of the misdeletion prevention switch reported by the IoT terminal is different from the status information of the misdeletion prevention switch of the IoT terminal recorded by the server, when updating the status information recorded in the server, the server may also synchronously control the user terminal to update the status information of the misdeletion prevention switch of the user terminal.

In a possible implementation of the first aspect, the reported status information is reported by the IoT terminal in a preset periodicity, and/or is reported when a status of the misdeletion prevention switch of the IoT terminal changes.

The IoT terminal reports the status information of the misdeletion prevention switch in the preset periodicity, and reports changed status information of the misdeletion prevention switch when detecting that the status of the misdeletion prevention switch changes. In this way, transmission resources and software and hardware resources of the IoT terminal can be saved. In addition, the status information of the misdeletion prevention switch of the IoT terminal recorded in the server can be updated in a timely manner, to prevent the terminal from being mistakenly deleted because the status information of the misdeletion prevention switch of the IoT terminal is not updated in a timely manner.

According to a second aspect, an embodiment of this application provides a method for preventing data misdeletion, applied to a user terminal. The method for preventing data misdeletion includes:

obtaining a first instruction sent by a server, where the first instruction is used to instruct the user terminal to synchronously open a misdeletion prevention switch of the user terminal, and is sent by the server in response to a first synchronization request of an IoT terminal, and the first synchronization request is generated when the IoT terminal detects that a misdeletion prevention switch of the IoT terminal is opened by a user;

synchronously opening the misdeletion prevention switch of the user terminal according to the first instruction;

obtaining a first deletion request of the user, where the first deletion request is used to request the server to delete data of the IoT terminal; and refusing to send the first deletion request to the server based on synchronously opening the misdeletion prevention switch of the user terminal based on the first synchronization request of the IoT terminal.

In this embodiment of this application, when the user opens the misdeletion prevention switch of the IoT terminal, the misdeletion prevention switch of the user terminal is simultaneously opened. When obtaining the first deletion request triggered by the user, the user terminal refuses to send the first deletion request to the server based on a premise that the misdeletion prevention switch of the user terminal is synchronously opened based on the first synchronization request of the IoT terminal, so that the first deletion request triggered by the user cannot reach the IoT terminal. In this case, data in the IoT terminal is not deleted, so that the IoT terminal can still be in an Internet of Things that the IoT terminal has accessed. This can prevent a case in which the IoT terminal is mistakenly deleted from the Internet of Things that the IoT terminal has accessed because the user triggers the first deletion request, and improve reliability of an IoT system.

In a possible implementation of the second aspect, the misdeletion prevention switch of the user terminal is displayed in a of the user terminal.

It may be understood that one or more misdeletion prevention switches may be displayed in the UI. When one misdeletion prevention switch is displayed in the UI, all IoT terminals under a same user account may be controlled. When a plurality of misdeletion prevention switches are displayed in the UI, the misdeletion prevention switches correspond to the IoT terminals, and one misdeletion prevention switch controls one IoT terminal.

In a possible implementation of the second aspect, the misdeletion prevention switch of the user terminal corresponds to the IoT terminal.

In a possible implementation of the second aspect, before the refusing to send the first deletion request to the server, the method further includes: determining that the misdeletion prevention switch displayed in the UI of the user terminal is opened.

In a possible implementation of the second aspect, the first deletion request is triggered by the user through the UI of the user terminal.

In a possible implementation of the second aspect, the deleting the data of the IoT terminal includes deleting the IoT terminal from the Internet of Things that the IoT terminal has accessed.

In a possible implementation of the second aspect, after the obtaining a first deletion request of the user, the method further includes: prompting, in a preset prompt manner, the user that the first deletion request is obtained.

In a possible implementation of the second aspect, the prompting, in a preset prompt manner, the user that the first deletion request is obtained includes:

popping up a prompt dialog box, where the prompt dialog box is used for the user to determine whether to delete the IoT terminal from the Internet of Things that the IoT terminal has accessed.

In a possible implementation of the second aspect, after the synchronously opening the misdeletion prevention switch of the user terminal according to the first instruction, the method further includes:

obtaining a second instruction sent by the server, where the first instruction is used to instruct the user terminal to synchronously close the misdeletion prevention switch of the user terminal, and is sent by the server in response to a second synchronization request of the IoT terminal, and the second synchronization request is generated when the IoT terminal detects that the misdeletion prevention switch of the IoT terminal is closed by the user; and synchronously closing the misdeletion prevention switch of the user terminal according to the second instruction.

In a possible implementation of the second aspect, after the synchronously closing the misdeletion prevention switch of the user terminal, the method further includes:

obtaining a second deletion request of the user, where the second deletion request is used to request the server to delete the data of the IoT terminal; and sending the second deletion request to the server, so that the data of the IoT terminal is deleted.

According to a third aspect, an embodiment of this application provides a method for preventing data misdeletion, applied to an IoT terminal. The method for preventing data misdeletion includes:

obtaining a first instruction sent by a server, where the first instruction is used to instruct the IoT terminal to synchronously open a misdeletion prevention switch of the IoT terminal, and is sent by the server in response to a first synchronization request of a user terminal, and the first synchronization request is generated when the user terminal detects that a misdeletion prevention switch of the user terminal is opened by a user;

synchronously opening the misdeletion prevention switch of the IoT terminal according to the first instruction;

obtaining a first deletion request generated by the IoT terminal, where the first deletion request is used to request the server to delete data of the IoT terminal; and refusing to respond to the first deletion request based on synchronously opening the misdeletion prevention switch of the IoT terminal based on the first synchronization request of the user terminal.

In this embodiment of this application, when the user opens the misdeletion prevention switch of the user terminal, the misdeletion prevention switch of the IoT terminal is synchronously opened. When obtaining the first deletion request generated by the IoT terminal, the IoT terminal refuses to respond to the first deletion request based on a premise that the misdeletion prevention switch of the IoT terminal is synchronously opened based on the first synchronization request of the user terminal. Even if the IoT terminal triggers the deletion request, data stored in the IoT terminal is not deleted, and the IoT terminal is still in an Internet of Things that the IoT terminal has accessed. This can prevent a case in which the IoT terminal is mistakenly deleted from the Internet of Things that the IoT terminal has accessed because the IoT terminal triggers the first deletion request, and improve the reliability of the IoT system.

In a possible implementation of the third aspect, the misdeletion prevention switch of the IoT terminal is a physical switch.

In a possible implementation of the third aspect, the deleting the data of the IoT terminal includes deleting the IoT terminal from the Internet of Things that the IoT terminal has accessed.

In a possible implementation of the third aspect, the first deletion request is generated by the IoT terminal in a firmware upgrade process.

To enrich functions of the IoT terminal, after a developer develops new firmware, a firmware upgrade file needs to be pushed to the IoT device through the server, to upgrade firmware in the IoT device. In the firmware upgrade process, the deletion request may be triggered when a network is abnormal or a firmware file is defective. Therefore, the deletion request may alternatively be triggered by the IoT terminal in the firmware upgrade process.

In a possible implementation of the third aspect, after the obtaining a first deletion request generated by the IoT terminal, the method further includes:

outputting prompt information, where the prompt information is used to prompt the user that the first deletion request is obtained.

In a possible implementation of the third aspect, the outputting prompt information includes:

outputting voice prompt information, or controlling an indicator to blink.

In a possible implementation, to help the user learn in time that the deletion request is currently obtained, when the misdeletion prevention switch of the IoT terminal is in an opened state, when obtaining the first deletion request, the IoT terminal may further prompt, in a preset prompt manner, the user that the first deletion request is obtained. For example, the IoT terminal may prompt, by playing preset voice prompt information, the user that the first deletion request is obtained, so that the user analyzes and processes a cause of the deletion request. For example, the voice prompt information may be "The deletion request has been obtained. Are you sure you want to delete the device?". However, the voice prompt information is not limited thereto, and may be set based on an actual situation. This is not limited herein.

When an indicator is correspondingly set for the misdeletion prevention switch, the indicator may be further controlled to blink in a preset blinking manner, to prompt the user that the first deletion request is obtained. The preset blinking manner may be blinking a plurality of times at a preset frequency, or controlling the indicator to alternately blink in different colors, or blink in another color. The another color is a color that is different from a color corresponding to a normal operating state.

In a possible implementation of the third aspect, the method for preventing data misdeletion further includes: reporting status information of the IoT terminal to the server, where the status information is used by the server to update and record status information of the misdeletion prevention switch of the IoT terminal.

In a possible implementation of the third aspect, the reported status information is reported by the IoT terminal in a preset periodicity, and/or is reported when a status of the misdeletion prevention switch of the IoT terminal changes.

In this manner, it can be ensured that the status information of the IoT terminal and status information of the misdeletion prevention switch of the user terminal that are recorded by the server are synchronized in real time with the misdeletion prevention switch of the IoT terminal, to avoid misdeletion caused by untimely update of the status information of the misdeletion prevention switch of the IoT terminal.

In a possible implementation of the third aspect, after the synchronously opening the misdeletion prevention switch of the IoT terminal according to the first instruction, the method further includes:

obtaining a second instruction sent by the server, where the second instruction is used to instruct the IoT terminal to synchronously close the misdeletion prevention switch of the IoT terminal, and is sent by the server in response to a second synchronization request of the user terminal, and the second synchronization request is generated when the user terminal detects that the misdeletion prevention switch of the user terminal is closed by the user; and synchronously closing the misdeletion prevention switch of the IoT terminal according to the second instruction.

In a possible implementation, when an indicator is correspondingly disposed for the misdeletion prevention switch, the indicator may indicate whether the misdeletion prevention switch of the IoT terminal is opened. That is, the indicator is turned on when the misdeletion prevention switch of the IoT terminal is in an opened state, and the indicator is turned off when the misdeletion prevention function of the IoT terminal is in a closed state.

In a possible implementation of the third aspect, after the synchronously closing the misdeletion prevention switch of the IoT terminal, the method further includes:

obtaining a second deletion request generated by the IoT terminal, where the second deletion request is used to request the server to delete data of the IoT terminal; and deleting the data of the IoT terminal in response to the second deletion request.

When the misdeletion prevention switch of the IoT terminal is in the closed state, if the IoT terminal receives the deletion request, the IoT terminal deletes data stored in the IoT terminal. The data stored in the IoT terminal includes data used for establishing a communication connection to the server. Therefore, after deleting the data stored in the IoT terminal, the IoT terminal cannot establish the communication connection to the server, and cannot access the Internet of Things.

According to a fourth aspect, an embodiment of this application provides an apparatus for preventing data misdeletion. The apparatus for preventing data misdeletion may be a server, and includes:

a first obtaining unit, configured to obtain a synchronization request sent by a user terminal, where the synchronization request is sent by the user terminal to the server when the user terminal detects that a misdeletion prevention switch of the user terminal is opened by a user, and is used to request an IoT terminal to synchronously open a misdeletion prevention switch of the IoT terminal;

a synchronization unit, configured to indicate, in response to the synchronization request, the IoT terminal to synchronously open the misdeletion prevention switch of the IoT terminal;

a second obtaining unit, configured to obtain a deletion request generated by the server, where the deletion request is used to request the server to delete data of the IoT terminal; and a response refusing unit, configured to refuse to respond to the deletion request based on synchronously opening the misdeletion prevention switch of the IoT terminal based on the synchronization request of the user terminal.

In a possible implementation of the fourth aspect, the misdeletion prevention switch of the user terminal is displayed in a user interface UI of the user terminal.

In a possible implementation of the fourth aspect, the misdeletion prevention switch of the user terminal corresponds to the IoT terminal.

In a possible implementation of the fourth aspect, the misdeletion prevention switch of the IoT terminal is a physical switch.

In a possible implementation of the fourth aspect, the deletion request is generated when the server operates in an abnormal state.

In a possible implementation of the fourth aspect, the deleting the data of the IoT terminal includes deleting the IoT terminal from an Internet of Things that the IoT terminal has accessed.

In a possible implementation of the fourth aspect, the apparatus for preventing data misdeletion further includes:

a recording unit, configured to record status information of the misdeletion prevention switch of the IoT terminal after the synchronization unit indicates, in response to the synchronization request, the IoT terminal to synchronously open the misdeletion prevention switch of the IoT terminal.

In a possible implementation of the fourth aspect, the apparatus for preventing data misdeletion further includes:

a determining unit, configured to: before the response refusing unit refuses to respond to the deletion request, determine that the misdeletion prevention switch of the IoT terminal is opened.

In a possible implementation of the fourth aspect, the determining unit is specifically configured to: after the recording unit records the status information of the misdeletion prevention switch of the IoT terminal, and before the response refusing unit refuses to respond to the deletion request, determine, based on the status information, that the misdeletion prevention switch of the IoT terminal is opened.

In a possible implementation of the fourth aspect, when the status information is recorded by using deletion protection identifier information, the determining unit is specifically configured to determine, based on the deletion protection identifier information, that the misdeletion prevention switch of the IoT terminal is opened.

In a possible implementation of the fourth aspect, when the status information is recorded by using a deletion protection field, the determining unit is specifically configured to determine, based on the deletion protection field, that the misdeletion prevention switch of the IoT terminal is opened.

In a possible implementation of the fourth aspect, the apparatus for preventing data misdeletion further includes:
a status updating unit, configured to: after the recording unit records the status information of the misdeletion prevention switch of the IoT terminal, update the recorded status information based on status information of the misdeletion prevention switch reported by the IoT terminal.

In a possible implementation of the fourth aspect, the reported status information is reported by the IoT terminal in a preset periodicity, and/or is reported when a status of the misdeletion prevention switch of the IoT terminal changes.

According to a fifth aspect, an embodiment of this application provides an apparatus for preventing data misdeletion. The apparatus for preventing data misdeletion may be a user terminal, and includes:
a first obtaining unit, configured to obtain a first instruction sent by a server, where the first instruction is used to instruct the user terminal to synchronously open a misdeletion prevention switch of the user terminal, and is sent by the server in response to a first synchronization request of an IoT terminal, and the first synchronization request is generated when the IoT terminal detects that a misdeletion prevention switch of the IoT terminal is opened by a user;
a synchronization opening unit, configured to synchronously open the misdeletion prevention switch of the user terminal according to the first instruction;
a second obtaining unit, configured to obtain a first deletion request of the user, where the first deletion request is used to request the server to delete data of the IoT terminal; and
a response refusing unit, configured to refuse to send the first deletion request to the server based on synchronously opening the misdeletion prevention switch of the user terminal based on the first synchronization request of the IoT terminal.

In a possible implementation of the fifth aspect, the misdeletion prevention switch of the user terminal is displayed in a UI of the user terminal.

In a possible implementation of the fifth aspect, the misdeletion prevention switch of the user terminal corresponds to the IoT terminal.

In a possible implementation of the fifth aspect, the apparatus for preventing data misdeletion may further include:
a determining unit, configured to: before the response refusing unit refuses to send the first deletion request to the server, determine that the misdeletion prevention switch displayed in the UI of the user terminal is opened.

In a possible implementation of the fifth aspect, the first deletion request is triggered by the user through the UI of the user terminal.

In a possible implementation of the fifth aspect, the deleting the data of the IoT terminal includes deleting the IoT terminal from an Internet of Things that the IoT terminal has accessed.

In a possible implementation of the fifth aspect, the apparatus for preventing data misdeletion further includes:
a prompting unit, configured to: after the second obtaining unit obtains the first deletion request of the user, prompt, in a preset prompt manner, the user that the first deletion request is obtained.

In a possible implementation of the fifth aspect, the prompting unit is specifically configured to pop up a prompt dialog box, where the prompt dialog box is used for the user to determine whether to delete the IoT terminal from the Internet of Things that the IoT terminal has accessed.

In a possible implementation of the fifth aspect, the apparatus for preventing data misdeletion further includes:
a third obtaining unit, configured to: after the synchronization opening unit synchronously opens the misdeletion prevention switch of the user terminal according to the first instruction, obtain a second instruction sent by the server, where the first instruction is used to instruct the user terminal to synchronously close the misdeletion prevention switch of the user terminal, and is sent by the server in response to a second synchronization request of the IoT terminal, and the second synchronization request is generated when the IoT terminal detects that the misdeletion prevention switch of the IoT terminal is closed by the user; and
a synchronous closing unit, configured to synchronously close the misdeletion prevention switch of the user terminal according to the second instruction.

In a possible implementation of the fifth aspect, the apparatus for preventing data misdeletion further includes:
a fourth obtaining unit, configured to obtain a second deletion request of the user after the synchronization closing unit synchronously closes the misdeletion prevention switch of the user terminal, where the second deletion request is used to request the server to delete data of the IoT terminal; and
a sending unit, configured to send the second deletion request to the server, so that the data of the IoT terminal is deleted.

According to a sixth aspect, an embodiment of this application provides an apparatus for preventing data misdeletion. The apparatus for preventing data misdeletion may be an IoT terminal, and includes:
a first obtaining unit, configured to obtain a first instruction sent by a server, where the first instruction is used to instruct the IoT terminal to synchronously open a misdeletion prevention switch of the IoT terminal, and is sent by the server in response to a first synchronization request of a user terminal, and the first synchronization request is generated when the user terminal detects that a misdeletion prevention switch of the user terminal is opened by a user;
a synchronization opening unit, configured to synchronously open the misdeletion prevention switch of the IoT terminal according to the first instruction;
a second obtaining unit, configured to obtain a first deletion request generated by the IoT terminal, where the first deletion request is used to request the server to delete data of the IoT terminal; and
a response refusing unit, configured to refuse to respond to the first deletion request based on synchronously opening the misdeletion prevention switch of the IoT terminal based on the first synchronization request of the user terminal.

In a possible implementation of the sixth aspect, the misdeletion prevention switch of the IoT terminal is a physical switch.

In a possible implementation of the sixth aspect, the deleting the data of the IoT terminal includes deleting the IoT terminal from an Internet of Things that the IoT terminal has accessed.

In a possible implementation of the sixth aspect, the first deletion request is generated by the IoT terminal in a firmware upgrade process.

In a possible implementation of the sixth aspect, the apparatus for preventing data misdeletion further includes:

a prompting unit, configured to output prompt information after the second obtaining unit obtains the first deletion request generated by the IoT terminal, where the prompt information is used to prompt the user that the first deletion request is obtained.

In a possible implementation of the sixth aspect, the prompting unit is specifically configured to:

output voice prompt information, or control an indicator to blink.

In a possible implementation of the sixth aspect, the apparatus for preventing data misdeletion further includes:

a status reporting unit, configured to report status information of the IoT terminal to the server, where the status information is used by the server to update and record status information of the misdeletion prevention switch of the IoT terminal.

In a possible implementation of the sixth aspect, the reported status information is reported by the IoT terminal in a preset periodicity, and/or is reported when a status of the misdeletion prevention switch of the IoT terminal changes.

In a possible implementation of the sixth aspect, the apparatus for preventing data misdeletion further includes:

a third obtaining unit, configured to: after the synchronization opening unit synchronously opens the misdeletion prevention switch of the IoT terminal according to the first instruction, obtain a second instruction sent by the server, where the second instruction is used to instruct the IoT terminal to synchronously close the misdeletion prevention switch of the IoT terminal, and is sent by the server in response to a second synchronization request of the user terminal, and the second synchronization request is generated when the user terminal detects that the misdeletion prevention switch of the user terminal is closed by the user; and a synchronous closing unit, configured to synchronously close the misdeletion prevention switch of the IoT terminal according to the second instruction.

In a possible implementation of the sixth aspect, the apparatus for preventing data misdeletion further includes:

a fourth obtaining unit, configured to obtain a second deletion request generated by the IoT terminal after the synchronization closing unit synchronously closes the misdeletion prevention switch of the IoT terminal, where the second deletion request is used to request the server to delete data of the IoT terminal; and a deletion unit, configured to delete the data of the IoT terminal in response to the second deletion request.

According to a seventh aspect, an embodiment of this application provides a device for preventing data misdeletion, including a memory, a processor, and a computer program that is stored in the memory and that can be run on the processor. When the processor executes the computer program, a device for preventing data misdeletion is enabled to perform the method for preventing data misdeletion in any possible implementation of the first aspect, or perform the method for preventing data misdeletion in any possible implementation of the second aspect, or perform the method for preventing data misdeletion in any possible implementation of the third aspect.

According to an eighth aspect, an embodiment of this application provides a computer-readable storage medium, where the computer-readable storage medium stores a computer program. When the computer program is executed by a processor, a device for preventing data misdeletion is enabled to perform the method for preventing data misdeletion in any possible implementation of the first aspect, or perform the method for preventing data misdeletion in any possible implementation of the second aspect, or perform the method for preventing data misdeletion in any possible implementation of the third aspect.

According to a ninth aspect, an embodiment of this application provides a computer program product. When the computer program product runs on a device for preventing data misdeletion, the device for preventing data misdeletion is enabled to perform the method for preventing data misdeletion in any possible implementation of the first aspect, or perform the method for preventing data misdeletion in any possible implementation of the second aspect, or perform the method for preventing data misdeletion in any possible implementation of the third aspect.

Compared with the conventional technology, embodiments of this application have the following beneficial effects.

A misdeletion prevention switch is set on the IoT terminal, and a misdeletion prevention switch is set on the user terminal. When the user opens the misdeletion prevention switch of the user terminal, the server indicates the misdeletion prevention switch of the IoT terminal to be opened synchronously. When obtaining a deletion request triggered by the server, the server refuses to respond to the deletion request. When obtaining a deletion request triggered by the IoT terminal, the IoT terminal refuses to respond to the deletion request. When the user opens the misdeletion prevention switch of the IoT terminal, the misdeletion prevention switch of the user terminal is synchronously opened. When the user terminal obtains the deletion request triggered by the user, the user terminal refuses to respond to the deletion request. In this way, if the misdeletion prevention switch of the IoT terminal is in the opened state, none of the server, the user terminal, and the IoT terminal responds to the deletion request, so that the related data of the IoT terminal is not mistakenly deleted. This improves reliability of the IoT system.

DESCRIPTION OF EMBODIMENTS

Figure 1:
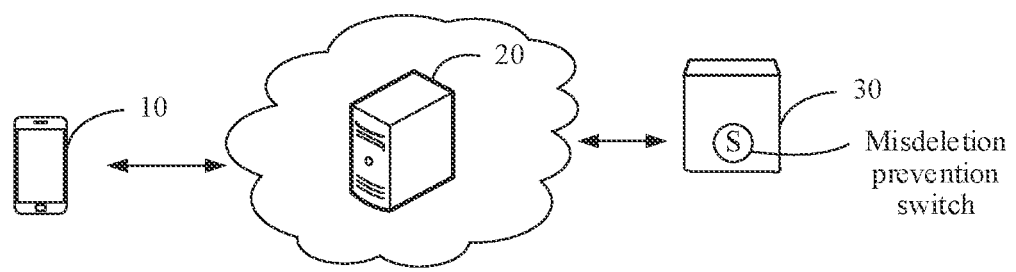
FIG. 1 is a schematic diagram of a system for preventing data misdeletion according to an embodiment of this application.

In the following description, to illustrate rather than limit, specific details such as a particular system structure and a technology are provided to make a thorough understanding of embodiments of this application. However, persons skilled in the art should know that this application may also be implemented in other embodiments without these specific details. In other cases, detailed descriptions of well-known systems, apparatuses, circuits, and methods are omitted, so that this application is described without being obscured by unnecessary details.

After a user connects an IoT terminal to a server corresponding to an IoT cloud platform through a preset app on a user terminal (the app includes but is not limited to a Health app and a Smart Home app), the IoT terminal may be triggered to clear local data in the following two cases, causing the IoT terminal to fail to log in to the server.

In one case, a misoperation of the user triggers the user terminal to deliver a deletion request to the IoT terminal through the server, or when the server works abnormally, the user terminal delivers a deletion request to the IoT terminal, to trigger the IoT terminal to clear the local data.

In the other case, with continuous enrichment of functions of an IoT device, a firmware upgrade file needs to be pushed to the IoT device through the server, to upgrade firmware in the IoT device. During firmware upgrade, if a network is abnormal or a firmware file is defective, the IoT terminal may be triggered to clear the local data.

A case in which an IoT terminal that has accessed a server is mistakenly deleted is not considered in most current IoT systems. In a solution for preventing misdeletion, when detecting the deletion request of the IoT terminal, the server delivers the deletion request to the IoT terminal, stores related data of the IoT terminal in a reset table of the server, and does not actually delete the data. In this way, when the data is mistakenly deleted, the server may restore the related data of the IoT terminal from the reset table. However, because the deletion request has been delivered to the IoT terminal, the IoT terminal responds to the deletion request, clears the local data, and is restored to factory settings. Because the local data of the IoT terminal is deleted, even if the server can restore the related data of the IoT terminal, the IoT terminal cannot successfully log in to the server because login information used for logging in to the server is missing, resulting in low reliability of the IoT system.

To resolve the foregoing problem, a case in which the IoT terminal cannot successfully log in to the server and access an Internet of Things due to misdeletion of the data of the IoT terminal is prevented, to improve reliability of the IoT system. Embodiments of this application provide a method for preventing data misdeletion. Specifically, a misdeletion prevention switch is set on an IoT terminal, and a misdeletion prevention switch is set on a user terminal. When a user opens the misdeletion prevention switch of the user terminal, a server indicates the misdeletion prevention switch of the IoT terminal to be opened synchronously. When obtaining a deletion request triggered by the server, the server refuses to respond to the deletion request. When obtaining a deletion request triggered by the IoT terminal, the IoT terminal refuses to respond to the deletion request. When the user opens the misdeletion prevention switch of the IoT terminal, the misdeletion prevention switch of the user terminal is synchronously opened. When the user terminal obtains a deletion request triggered by the user, the user terminal refuses to respond to the deletion request.

In this way, if the misdeletion prevention switch of the IoT terminal is in an opened state, none of the server, the user terminal, and the IoT terminal responds to the deletion request, so that related data of the IoT terminal is not mistakenly deleted.

In addition, when the misdeletion prevention switch of the user terminal is in the opened state, if the user terminal obtains the deletion request, the user terminal may pop up a prompt box to prompt the user that the deletion request is obtained, and may further ask the user whether to delete the related data of the IoT device. If the misdeletion prevention switch of the IoT terminal is in an opened state, when the deletion request is obtained, the IoT terminal may control an indicator corresponding to the misdeletion prevention switch of the IoT terminal to blink, to prompt the user, or may prompt the user in a voice broadcast manner, to facilitate troubleshooting performed by the user, for example, check whether a firmware upgrade fault occurs on the IoT terminal, and check whether the server works abnormally.

To make the objectives, technical solutions, and advantages of this application clearer, the following further describes in detail specific implementations for preventing data misdeletion in this application with reference to the accompanying drawings. It may be understood that terms used in this application are merely intended to describe specific embodiments, but are not intended to limit this application. Terms "one", "a" and "this" of singular forms used in this specification and the appended claims of this application are also intended to include expressions such as "one or more", unless otherwise specified in the context clearly. It should be further understood that, in embodiments of this application, "one or more" refers to one, two, or more, and the term "and/or" describes an association between associated objects, and indicates that three relationships may exist. For example, A and/or B may indicate the following cases: Only A exists, both A and B exist, and only B exists, where A and B may be singular or plural. The character "/" usually indicates an "or" relationship between the associated objects.

FIG. 1 is a schematic diagram of a system for preventing data misdeletion according to an embodiment of this application. In the schematic diagram of the system shown in FIG. 1, the system includes a user terminal 10, a server 20, and at least one IoT terminal 30. The server 20 is a server corresponding to an IoT cloud platform. The server 20 may separately communicate with the user terminal 10 and the IoT terminal 30. Each of the user terminal 10 and the IoT terminal 30 is disposed with a misdeletion prevention switch. The misdeletion prevention switch may be a virtual switch displayed in a UI, or may be a physical switch. An existence form of the misdeletion prevention switch is not limited in this embodiment. When the misdeletion prevention switch is a virtual switch displayed in the UI, a user may tap the virtual switch to open the misdeletion prevention switch, or may open the misdeletion prevention switch in another manner, for example, tap a selection box corresponding to the misdeletion prevention switch, to select to open the misdeletion prevention switch. However, the opening manner of the misdeletion prevention switch is not limited thereto. The opening manner of the misdeletion prevention switch displayed in the is not limited in this application.

The user terminal 10 may be a terminal device on which a preset app can be installed, for example, a mobile phone, a tablet computer, a wearable device, a notebook computer, a netbook, or a personal digital assistant (Personal Digital Assistant, PDA). The app includes but is not limited to a Health app, a Smart Home app, and the like. The app has a domain name of the server 20. When starting the app, the user terminal 10 may establish a communication connection to the server 20 based on the domain name.

The IoT terminal 30 is a smart home device that can access the Internet, for example, a smart desk lamp, a smart socket, a smart switch, a gateway, a door and window sensor, a curtain controller, a temperature and humidity sensor, a smart sound box, and a smart sweeper.

Figure 2:
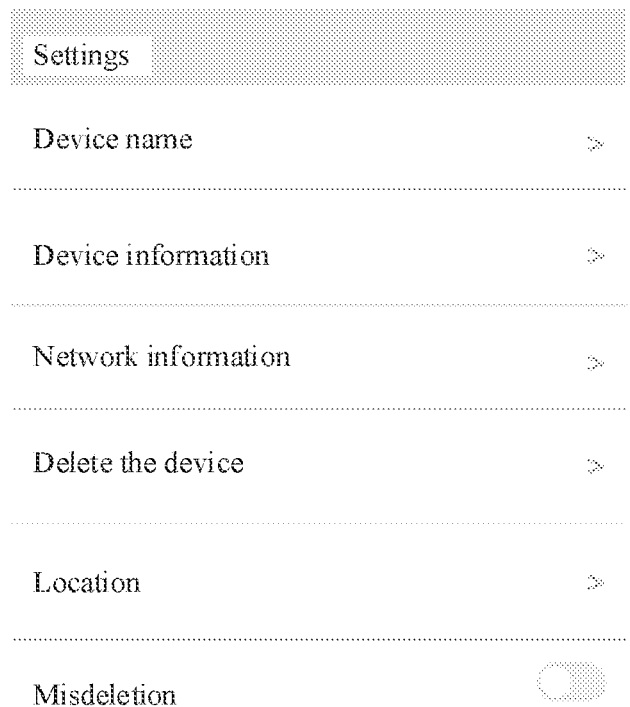
FIG. 2 is a schematic diagram of a user interface of an app according to an embodiment of this application.

In a possible implementation, FIG. 2 is a schematic diagram of an interaction interface of an app according to an embodiment of this application. The misdeletion prevention switch of the user terminal 10 is displayed in the UI of the user terminal, for example, a "Misdeletion" virtual switch in FIG. 2. The misdeletion prevention switch of the IoT terminal 30 is a physical switch, for example, a misdeletion prevention switch "S" shown in FIG. 1. The user may control the misdeletion prevention switch S to open or close the misdeletion prevention switch. When the misdeletion prevention switch S is opened, the misdeletion prevention switch may be opened, to indicate that the misdeletion prevention switch is currently in an opened state.

It may be understood that one or more misdeletion prevention switches may be displayed in the UI of the user terminal. When one misdeletion prevention switch is displayed in the UI, all IoT terminals managed by the preset app in the user terminal may be controlled. These IoT terminals may belong to a same user account, or may belong to different user accounts. The user account is an account used to log in to the preset app. All the IoT terminals under the same user account may be IoT terminals in a family. When a plurality of misdeletion prevention switches are displayed in the UI, the misdeletion prevention switch may correspond to the IoT terminal, and one misdeletion prevention switch controls one IoT terminal.

The user may add the IoT terminal 30 through the user terminal 10, so that the IoT terminal 30 accesses the Internet of Things. After the IoT terminal 30 accesses the Internet of Things, when the user opens the misdeletion prevention switch of the user terminal 10, the server 20 indicates the IoT terminal 30 to simultaneously open the misdeletion prevention switch of the IoT terminal 30. When the user opens the misdeletion prevention switch of the IoT terminal 30, the server 20 indicates the user terminal 10 to synchronously open the misdeletion prevention switch of the user terminal 10.

The user may control, through the misdeletion prevention switch displayed in the UI of the user terminal 10, the IoT terminal 30 to synchronously open the misdeletion prevention switch of the IoT terminal 30. When the IoT terminal 30 supports infrared remote control, the user may alternatively use a remote control to remotely control the IoT terminal 30 by using an infrared remote control technology, so that the IoT terminal 30 opens the misdeletion prevention switch of the IoT terminal 30.

In a possible implementation, the user adds the IoT terminal 30 through the user terminal 10 in the following implementation process:

When the user starts the app in the user terminal 10, the user terminal 10 establishes the communication connection to the server 20 based on the domain name of the server. In addition, the user terminal 10 may enable a "device discovery" function, and check whether an IoT terminal that supports remote control by the app exists in a current environment.

When the IoT terminal 30 is powered on and works, the IoT terminal 30 may transmit a detection signal in a broadcast or multicast manner. The detection signal includes device information of the IoT terminal 30. The detection signal is used to notify the user terminal on which the app is installed that the IoT terminal that supports remote control by the app exists in the current environment.

When detecting the detection signal transmitted by the IoT terminal 30, the user terminal 10 parses the detection signal, and displays, in a display interface, the device information obtained through parsing. The user may tap any device information displayed in the display interface, to select an IoT terminal to be added, so as to trigger the user terminal 10 to establish a communication connection to the corresponding IoT terminal based on the device information selected by the user.

After the user starts the app, the user terminal 10 has established the communication connection to the server 20. After establishing the communication connection to the IoT terminal selected by the user, the user terminal 10 determines that a new IoT terminal currently needs to be registered with the server 20, obtains registration permission information from the server 20 through a northbound data interface, and forwards the registration permission information to the corresponding IoT terminal 30 based on the device information selected by the user. The northbound data interface is a data transmission interface provided by the server for the user terminal 10. The registration permission information may include a login key, a domain-shared key, and a verification code.

The IoT terminal 30 stores the domain name of the server 20 before delivery. When receiving the registration permission information, the IoT terminal 30 establishes a TCP connection to the server 20 based on the domain name of the server 20 by using the Transmission Control Protocol (Transmission Control Protocol, TCP). In this case, the IoT terminal 30 cannot communicate with the server 20. The IoT terminal 30 logs in to the server 20 by using the login key in the registration permission information, and sends registration request information to the server 20. The registration request information includes the verification code and the domain-shared key. When receiving the registration request information, the server 20 verifies the verification code and the domain-shared key that are included in the registration request information, and opens a southbound data interface to the IoT terminal 30 after the verification succeeds. The southbound data interface is a data transmission interface provided by the server for the IoT terminal 30. The IoT terminal 30 uploads the device information of the IoT terminal 30 to the server 20 through the southbound data interface for registration. After the registration succeeds, the communication connection between the IoT terminal 30 and the server 20 is established. The server 20 adds the device information of the IoT terminal 30 to a device list for storage. The device information may include a media access control (Media Access Control, MAC) address, an Internet Protocol address (Internet Protocol Address, IP address), attribute information, and the like of the IoT terminal.

After the IoT terminal 30 establishes the communication connection to the server 20, the IoT terminal 30 may upload status information of the misdeletion prevention switch S and related data generated in a working process to the server 20. When the user starts the app in the user terminal 10, the user terminal 10 may obtain the related data of the IoT terminal 30 from the server 20 through the northbound data interface for display. For example, the user selects any IoT terminal 30 in a device management interface of the user terminal 10, and accesses a device details interface corresponding to the IoT terminal 30 to view the status information, working data, and the like of the misdeletion prevention switch S of the IoT terminal 30. The northbound data interface is a data transmission interface provided by the server for the user terminal 10.

It may be understood that, after the IoT terminal 30 establishes the communication connection to the server 20 to access the Internet of Things, the user may control, through a reset button disposed on the IoT terminal 30, the IoT terminal 30 to clear the local data, so as to restore the IoT terminal 30 to factory settings. The user may also tap a "Delete the device" option shown in FIG. 2, to control the IoT terminal 30 to clear the local data. After the IoT terminal 30 is restored to factory settings, because data used for establishing the communication connection to the server 20 is also deleted, the IoT terminal 30 cannot perform data interaction with the server 20, and is deleted from the Internet of Things that the IoT terminal 30 has joined. The server 20 cannot obtain real-time data of the IoT terminal 30. The user cannot view the IoT terminal 30 from the app in the user terminal 10.

After the IoT terminal 30 establishes the communication connection to the server 20, and accesses the Internet of Things, the user terminal 10 may trigger a deletion request due to a misoperation of the user, the server 20 may trigger a deletion request, and the IoT terminal 30 may also trigger a deletion request. The following describes in detail, with reference to the accompanying drawings, a detailed process of preventing data misdeletion by a related device in FIG. 1.

Figure 3:
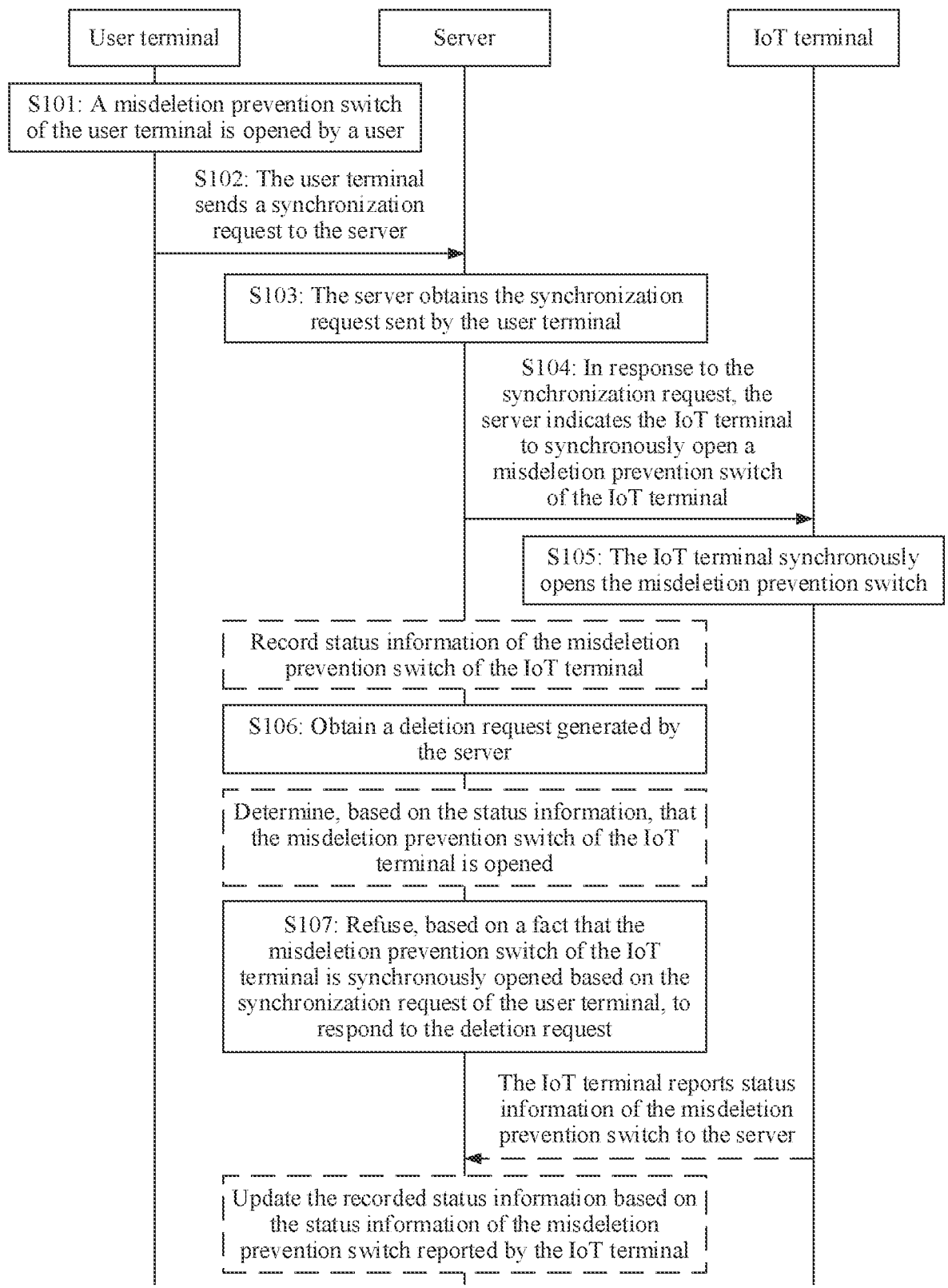
FIG. 3 is an interaction diagram of a method for preventing data misdeletion according to an embodiment of this application.

FIG. 3 is an interaction diagram of a method for preventing data misdeletion according to an embodiment of this application. Specifically, the method for preventing data misdeletion includes the following steps.

S101: A misdeletion prevention switch of a user terminal is opened by a user.

The misdeletion prevention switch of the user terminal may be a virtual switch displayed in a UI, or may be a physical switch. An existence form of the misdeletion prevention switch is not limited in this embodiment.

The user terminal may determine, based on status information of the virtual switch displayed in the UI, whether the misdeletion prevention switch of the user terminal is opened by the user. The user terminal may alternatively determine, based on status information of the physical switch, whether the misdeletion prevention switch of the user terminal is opened by the user.

Optionally, the misdeletion prevention switch of the user terminal is displayed in a user interface UI of the user terminal. The user may tap the virtual switch to open the misdeletion prevention switch, or may open the misdeletion prevention switch in another manner, for example, tap a selection box corresponding to the misdeletion prevention switch, to select to open the misdeletion prevention switch. The opening manner of the misdeletion prevention switch is not limited thereto. The opening manner of the misdeletion prevention switch displayed in the UI is not limited in this application.

Optionally, the misdeletion prevention switch of the user terminal is in a one-to-one correspondence with an IoT terminal. One or more misdeletion prevention switches may be displayed in the UI of the user terminal. When one misdeletion prevention switch is displayed in the UI, all IoT terminals under a same user account may be controlled. When a plurality of misdeletion prevention switches are displayed in the UI, the misdeletion prevention switches correspond to the IoT terminals, and one misdeletion prevention switch controls one IoT terminal. All the IoT terminals under the same user account may be IoT terminals in a family.

S102: The user terminal sends a synchronization request to a server, where the synchronization request is used to request the IoT terminal to synchronously open a misdeletion prevention switch of the IoT terminal.

The user adds the IoT terminal through the user terminal. When adding the IoT terminal to an Internet of Things, the server binds a user account for logging in to the user terminal and identification information of the IoT terminal, the user terminal establishes an association relationship between the misdeletion prevention switch of the user terminal and the IoT terminal, and the IoT terminal stores the identification information of the IoT terminal and the user account of the user terminal in association.

When determining that the misdeletion prevention switch of the user terminal is opened by the user, the user terminal sends the synchronization request to the server. The synchronization request is used to request the IoT terminal that is associated with the user account for logging in to the user terminal to synchronously open the misdeletion prevention switch of the IoT terminal. The user account may be an account used by the user to log in to a Smart Home app.

When the misdeletion prevention switch of the user terminal is used to control all the IoT terminals belonging to the same user account, the synchronization request is used to request all the IoT terminals belonging to the same user account to synchronously open the misdeletion prevention switches of the IoT terminals.

When the misdeletion prevention switch of the user terminal is in the one-to-one correspondence with the IoT terminal, the synchronization request is used to request the IoT terminal corresponding to the misdeletion prevention switch to synchronously open the misdeletion prevention switch.

The synchronization request may carry the identification information of the IoT terminal. The synchronization request may also carry the user account corresponding to the user terminal, and the user account is used by the server to obtain the identification information of the IoT terminal associated with the user account.

S103: The server obtains the synchronization request sent by the user terminal.

S104: In response to the synchronization request, the server indicates the IoT terminal to synchronously open the misdeletion prevention switch of the IoT terminal.

When obtaining the synchronization request sent by the user terminal, the server may send an instruction to the IoT terminal, to instruct the IoT terminal to synchronously open the misdeletion prevention switch of the IoT terminal.

Specifically, when the synchronization request carries the identification information of the IoT terminal, the server may indicate, based on the identification information of the IoT terminal carried in the synchronization request, the IoT terminal corresponding to the identification information to synchronously open the misdeletion prevention switch.

When the synchronization request carries the user account, the server may also obtain the identification information of the IoT terminal associated with the user account, and indicate, based on the obtained identification information of the IoT terminal, the IoT terminal corresponding to the identification information to synchronously open the misdeletion prevention switch.

Optionally, after S104, the server may further record status information of the misdeletion prevention switch of the IoT terminal.

Optionally, the status information may be recorded by using deletion protection identifier information, "0" or "1" are used in the deletion protection identifier information to respectively identify that the misdeletion prevention switch of the IoT terminal is in a closed state or an opened state. It may be understood that, in another implementation, the deletion protection identifier information may alternatively be represented by using another value or field information, which is not limited herein.

Optionally, the status information may also be recorded by using a deletion protection field. For example, to conveniently manage status information of the misdeletion prevention switch of each IoT terminal and improve efficiency of searching for the status information of the misdeletion prevention switch, the server may establish a data storage table used to store related data of the IoT terminal, and add the deletion protection field to the data storage table. The deletion protection field, for example, a deletion guard field, is used to fill in the status information of the misdeletion prevention switch of the IoT terminal. When the misdeletion prevention switch of the IoT terminal is in the opened state, a value of the field is set to "true" or "1", which indicates that the IoT terminal is in a misdeletion protection state, and the server refuses to deliver the deletion request to the IoT terminal. When the misdeletion prevention switch of the IoT terminal is in the closed state, the value of the field is set to "false" or "0", which indicates that the IoT terminal is not in the misdeletion protection state. When the IoT terminal is not in the misdeletion protection state, the server may deliver the deletion request to the IoT terminal.

The server may store the identification information of the IoT terminal and the status information of the misdeletion prevention switch in association.

S105: The IoT terminal synchronously opens the misdeletion prevention switch.

The IoT terminal synchronously opens the misdeletion prevention switch of the IoT terminal in response to the instruction sent by the server.

The misdeletion prevention switch of the IoT terminal may be a physical switch disposed on the IoT terminal, or may be a virtual switch displayed in a UI, for example, displayed on a display screen of the IoT terminal.

Optionally, the misdeletion prevention switch of the IoT terminal is a physical switch.

The IoT terminal may report the status information of the misdeletion prevention switch of the IoT terminal to the server. The status information may be reported by the IoT terminal in a preset periodicity, and/or may be reported when a status of the misdeletion prevention switch of the IoT terminal changes.

For example, it is assumed that the IoT terminal is a smart sound box, when determining that a misdeletion prevention switch S is currently opened, the smart sound box may report "opened state" or "1" to the server. When determining that the misdeletion prevention switch S is not currently opened, the smart sound box may report "closed state" or "0" to the server.

For another example, the smart sound box reports status information of the misdeletion prevention switch by using a deletion guard field. For example, when the smart sound box determines that the misdeletion prevention switch S is currently opened, the status information reported by the smart sound box is "deletion Guard, 1 or true". When the smart sound box determines that the misdeletion prevention switch S is not opened, the status information reported by the smart sound box is "deletion Guard, 0 or false".

To save software and hardware resources of the IoT terminal and reduce power consumption of the IoT terminal, in this embodiment, the IoT terminal reports the status information of the misdeletion prevention switch in the preset periodicity, and reports changed status information of the misdeletion prevention switch when detecting that the status of the misdeletion prevention switch changes. In this way, transmission resources and the software and hardware resources of the IoT terminal can be saved. In addition, the status information of the misdeletion prevention switch of the IoT terminal recorded in the server can be updated in a timely manner, to prevent the IoT terminal from being mistakenly deleted because the status information of the misdeletion prevention switch of the IoT terminal is not updated in a timely manner.

Optionally, after the server records the status information of the misdeletion prevention switch of the IoT terminal, the method further includes:

The server updates the recorded status information based on the status information of the misdeletion prevention switch reported by the IoT terminal.

If the status information of the misdeletion prevention switch reported by the IoT terminal is different from the status information of the misdeletion prevention switch of the IoT terminal recorded by the server, when updating the status information recorded in the server, the server may also synchronously control the user terminal to update the status information of the misdeletion prevention switch of the user terminal.

For example, when the status information of the misdeletion prevention switch reported by the smart sound box is "closed state", and a field value that corresponds to the "deletion protection" (deletion Guard) field corresponding to the smart sound box and that is recorded by the server is "true" or "1", the server changes the field value corresponding to the deletion guard field to "false" or "0".

When the status information of the misdeletion prevention switch reported by the smart sound box is "opened state", and the field value that corresponds to the "deletion protection" (deletion Guard) field corresponding to the smart sound box and that is recorded by the server is "false" or "0", the server changes the field value corresponding to the deletion guard field to "true" or "1".

It may be understood that, when the status information reported by the smart sound box is "deletion Guard, 1 or true", and the field value of the deletion Guard field of the smart sound box recorded in a database of the server is "false" or "0", the server changes the field value of the deletion guard field corresponding to the smart sound box to "true" or "1".

S106: Obtain a deletion request generated by the server, where the deletion request is used to request the server to delete data of the IoT terminal.

The deletion request may be used to request the server to delete data of the IoT terminal stored in the server, or may request the server to delete data stored in the IoT terminal.

Optionally, the deletion request is generated when the server works in an abnormal state. The abnormal state may be that the database of the server breaks down, or the server cannot obtain information about an IoT device in an IoT system. When the misdeletion prevention switch of the IoT terminal is in the opened state, when the server works in the abnormal state, the server does not delete the data of the IoT terminal even if the server generates the deletion request. After the server recovers to the normal operating state, the IoT terminal can still communicate normally with the server.

Optionally, deleting the data of the IoT terminal includes deleting the IoT terminal from an Internet of Things that the IoT terminal has accessed.

Both the data of the IoT terminal stored in the server and the data stored in the IoT terminal include data used for establishing a communication connection between the IoT terminal and the server. Therefore, after the data of the IoT terminal is deleted, the IoT terminal cannot establish the communication connection with the server, and is deleted from the Internet of Things that the IoT terminal has accessed.

Optionally, after the server records the status information of the misdeletion prevention switch of the IoT terminal, and before the server refuses to respond to the deletion request in S107, the server may further determine that the misdeletion prevention switch of the IoT terminal is opened.

Because the server stores the related data of the IoT terminal, the server may determine, based on the related data of the IoT terminal stored in the server, whether the misdeletion prevention switch of the IoT terminal is opened.

In addition, the server may further obtain the status information of the misdeletion prevention switch reported by the IoT terminal, and determine, based on the status information of the misdeletion prevention switch reported by the IoT terminal, whether the misdeletion prevention switch of the IoT terminal is opened.

Optionally, when the server records the status information of the misdeletion prevention switch of the IoT terminal, the server may determine, based on the status information, that the misdeletion prevention switch of the IoT terminal is opened.

Optionally, determining, based on the status information, that the misdeletion prevention switch of the IoT terminal is opened may include:

When recording the status information by using the deletion protection identifier information, the server may determine, based on the deletion protection identifier information, that the misdeletion prevention switch of the IoT terminal is opened.

When recording the status information by using the deletion protection field, the server determines, based on the deletion protection field, that the misdeletion prevention switch of the IoT terminal is opened.

For example, the server queries the deletion protection identifier information stored in the server. When the deletion protection identifier information corresponding to the IoT terminal is "opened state" or "1", the misdeletion prevention switch of the IoT terminal is opened.

The server queries field information that is of the deletion protection field and stored in the server. When the deletion protection field corresponding to the IoT terminal is "deletion Guard, 1 or true", the misdeletion prevention switch of the IoT terminal is opened.

S107: The server refuses to respond to the deletion request based on synchronously opening the misdeletion prevention switch of the IoT terminal based on the synchronization request of the user terminal.

Based on a premise that the misdeletion prevention switch of the IoT terminal is synchronously opened based on the synchronization request of the user terminal, the server refuses to respond to the deletion request, does not delete the data of the IoT terminal stored in the server, and refuses to deliver the deletion request to the corresponding IoT terminal. In this way, the data stored in the server and the data stored in the IoT terminal are not deleted.

In a possible implementation, that the server refuses to respond to the deletion request after determining that the misdeletion prevention switch of the IoT terminal is opened includes: skipping deleting the data of the IoT terminal stored in the server, and sending the deletion request to the corresponding IoT terminal. Because the misdeletion prevention switch of the IoT terminal is opened, even if the server sends the deletion request to the IoT terminal, the IoT terminal does not respond to the deletion request, so that the data of the IoT terminal is not mistakenly deleted.

The data of the IoT terminal stored in the server includes but is not limited to registration information, a MAC address, an IP address, historical data, and the like of the IoT terminal.

The data stored in the IoT terminal includes but is not limited to the data used for establishing the communication connection to the server. The data may include any one or any combination of at least two of the following: a login key, a domain-shared key, login token (token) information, and the like.

In this embodiment of this application, a misdeletion prevention switch is set on the IoT terminal, and a misdeletion prevention switch is set on the user terminal. When the user opens the misdeletion prevention switch of the user terminal, the misdeletion prevention switch of the IoT terminal is synchronously opened. When the server obtains the deletion request, the server refuses to respond to the deletion request and refuses to deliver the deletion request to the corresponding IoT terminal based on the premise that the misdeletion prevention switch of the terminal is synchronously opened based on the synchronization request of the user terminal. In this manner, even if the server triggers the deletion request, the server does not clear the related data of the IoT terminal, and does not deliver the deletion request. This can prevent the related data of the IoT terminal from being mistakenly deleted, and prevent the IoT terminal from being mistakenly deleted from the Internet of Things that the IoT terminal has accessed. When the server recovers to the normal operating state, the server can still obtain real-time data of the IoT terminal in real time.

A case in which maintenance personnel need to spend a large amount of time restoring the related data of the IoT terminal because the data of the IoT terminal in the server is mistakenly deleted, to recover the IoT system to the normal state can be avoided, and workload of maintenance personnel of the Internet of Things system can be reduced.

A case in which the user needs to add the IoT terminal to the Internet of Things again because the IoT terminal is mistakenly deleted from the Internet of Things that the IoT terminal has accessed can be avoided, and user operations can be reduced.

It may be understood that, when the user closes the misdeletion prevention switch of the user terminal, the user terminal sends the synchronization request to the server, and the misdeletion prevention switch of the IoT terminal is synchronously closed based on the synchronization request of the user terminal. When the server obtains the deletion request generated by the server, the server deletes the data of the IoT terminal stored in the server, and sends the deletion request the corresponding IoT terminal, to request the IoT terminal to delete the data stored in the IoT terminal, so as to delete the IoT terminal from the Internet of Things that the IoT terminal has accessed.

Figure 4A:
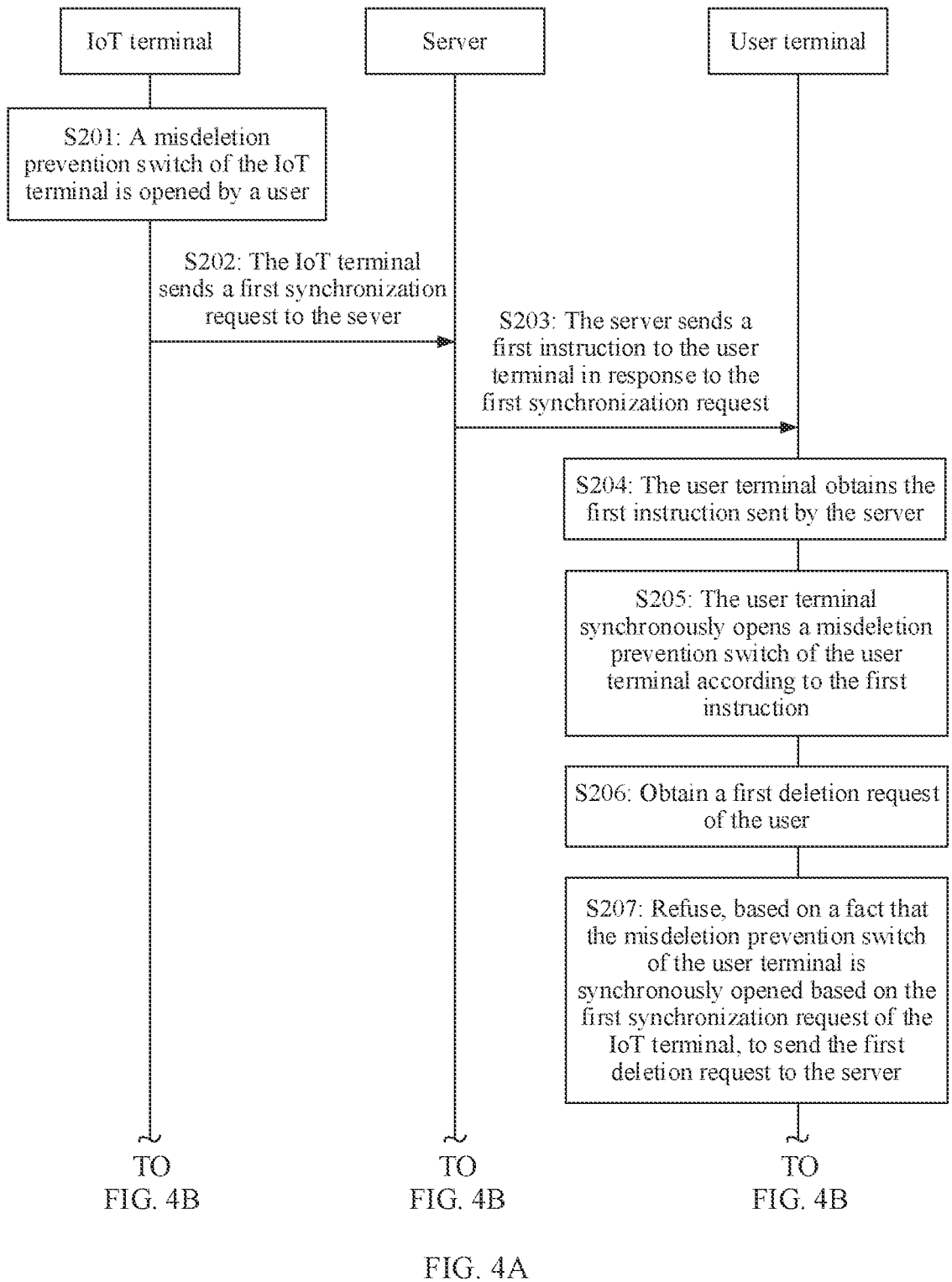
FIG. 4A and FIG. 4B are an interaction diagram of a method for preventing data misdeletion according to another embodiment of this application.
Figure 4B:
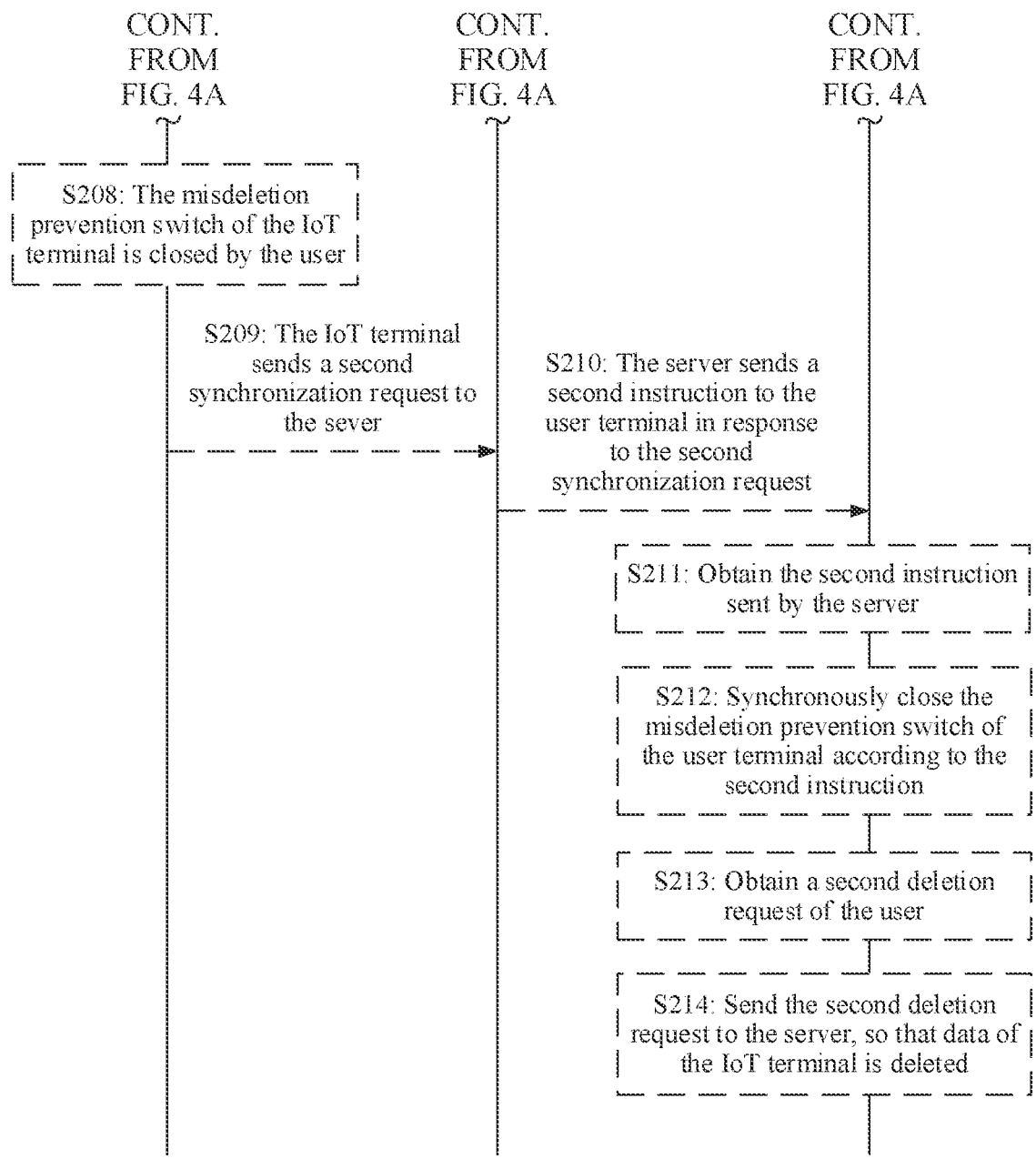

FIG. 4A and FIG. 4B are an interaction diagram of a method for preventing data misdeletion according to another embodiment of this application. Specifically, the method for preventing data. misdeletion includes the following steps.

S201: A misdeletion prevention switch of an IoT terminal is opened by a user.

The misdeletion prevention switch of the IoT terminal may be a virtual switch displayed in a UI of the IoT terminal, for example, displayed on a liquid crystal display of the IoT terminal. The IoT terminal may alternatively be a physical switch. An existence form of the misdeletion prevention switch is not limited in this embodiment.

The user may trigger a physical switch on the IoT terminal or a virtual switch displayed on a touch display of the IoT terminal, to open the misdeletion prevention switch of the IoT terminal. When the IoT terminal supports an infrared remote control technology, the user can also use an infrared remote control to control the IoT terminal to open the misdeletion prevention switch.

The IoT terminal may determine, based on status information of the virtual switch displayed in the UI, whether the misdeletion prevention switch of the IoT terminal is opened by the user. The IoT terminal may alternatively determine, based on status information of the physical switch, whether the misdeletion prevention switch of the IoT terminal is opened by the user.

The IoT terminal generates a first synchronization request when detecting that the misdeletion prevention switch of the IoT terminal is opened by the user.

The first synchronization request is used to request a user terminal corresponding to a user account that is associated with the IoT terminal to synchronously open a misdeletion prevention switch of the user terminal. The first synchronization request may carry the user account associated with the IoT terminal, and may further carry identification information of the IoT terminal.

The user account is used by a server to send, when receiving the first synchronization request sent by the IoT terminal, a first instruction to the user terminal that logs in to the user account.

S202: The IoT terminal sends the first synchronization request to the server.

S203: The server sends the first instruction to the user terminal in response to the first synchronization request of the IoT terminal, where the first instruction is used to instruct the user terminal to synchronously open the misdeletion prevention switch of the user terminal.

The server may send the first instruction based on the user account carried in the first synchronization request, to send the first instruction to the user terminal that logs in to the user account. The first instruction is used to instruct the user terminal to synchronously open the misdeletion prevention switch of the user terminal.

The first instruction may include the identification information of the IoT terminal carried in the first synchronization request. The identification information of the IoT terminal is used by the user terminal to synchronously open, when obtaining the first instruction, the misdeletion prevention switch that corresponds to the IoT terminal corresponding to the identification information in the user terminal. The first instruction may include identification information of one IoT terminal, or may include identification information of a plurality of IoT terminals. This is not limited herein.

S204: The user terminal obtains the first instruction sent by the server.

S205: The user terminal synchronously opens the misdeletion prevention switch of the user terminal according to the first instruction.

Optionally, the misdeletion prevention switch of the user terminal is displayed in a UI of the user terminal.

It may be understood that the misdeletion prevention switch displayed in the UI may be a main switch, or may be a plurality of branch switches respectively corresponding to user accounts or IoT terminals.

When the misdeletion prevention switch is a main switch, the main switch is used to control all IoT terminals to synchronously open misdeletion prevention switches of the IoT terminals. When the misdeletion prevention switch is branch switches corresponding to user accounts, the branch switches are used to control IoT terminals that belong to a same user account to synchronously open misdeletion prevention switches of the IoT terminals. When the misdeletion prevention switch is branch switches corresponding to IoT terminals, the branch switches are used to control the IoT terminals to synchronously open misdeletion prevention switches of the IoT terminals.

It may be understood that, when the first instruction does not include the identification information of the IoT terminal, the user terminal may synchronously open the main switch in the user terminal. When the first instruction includes a user account, the user terminal may synchronously open a branch switch corresponding to the user account in the user terminal. When the first instruction includes the identification information of the IoT terminal, the user terminal may synchronously open a branch switch in the user terminal corresponding to the identification information of the IoT terminal. When the first instruction includes the user account and the identification information of the IoT terminal, the user terminal may synchronously open a branch switch in the user terminal corresponding to the identification information of the IoT terminal that is associated with the user account.

S206: The user terminal obtains a first deletion request of the user, where the first deletion request is used to request the server to delete data of the IoT terminal.

The user terminal obtains the first deletion request triggered by the user. The first deletion request may be triggered by the user through a physical button disposed on the user terminal, or may be triggered by the user through the UI of the user terminal.

Optionally, the first deletion request is triggered by the user through the UI of the user terminal. For example, when the user opens an interaction interface corresponding to any IoT terminal shown in FIG. 2, and taps "Delete the device" in the interaction interface, the user terminal is triggered to generate the first deletion request used to identify deleting the IoT terminal.

Optionally, deleting the data of the IoT terminal includes deleting the IoT terminal from an Internet of Things that the IoT terminal has accessed.

The first deletion request is used to request the user terminal to delete related data of the IoT terminal stored in the user terminal, so as to delete the IoT terminal from a device list displayed by a preset app of the user terminal, and is used to request the IoT terminal to delete data that is stored in the IoT terminal and used to establish a communication connection to the server.

The first deletion request may request the user terminal to delete all IoT terminals in the device list displayed by the preset app, or may request the user terminal to delete an IoT terminal in the device list. For example, when the first deletion request is triggered by the user through a setting interface of an IoT terminal, the first deletion request carries identification information of the terminal, and the first deletion request is used to request the server to delete the IoT terminal.

Optionally, before S207, the method further includes: determining that the misdeletion prevention switch displayed in the UI of the user terminal is opened.

For example, the user terminal may read "Misdeletion" in the UI of the user terminal shown in FIG. 2, and determine whether the misdeletion prevention switch of the user terminal is opened based on whether the misdeletion prevention function switch is currently in an opened state or in a closed state.

Optionally, to help the user learn in time that the user terminal obtains the deletion request, after S26, the method may further include: prompting, in a preset prompt manner, the user that the first deletion request is obtained.

For example, when obtaining the deletion request triggered by the user, the user terminal may broadcast preset prompt information by voice, or may display the preset prompt information.

Optionally, the prompting, in a preset prompt manner, the user that the first deletion request is obtained includes:

popping up a prompt dialog box, where the prompt dialog box is used for the user to determine whether to delete the IoT terminal from the Internet of Things that the IoT terminal has accessed.

For example, the user terminal may pop up a prompt box to prompt the user, and information such as "The deletion request has been obtained. Are you sure you want to delete the device?" may be displayed in the prompt box. This is not limited thereto, and may be set based on an actual situation. This is not limited herein. The user terminal may alternatively prompt the user by using a voice, so that the user can analyze and process a cause of generating the deletion instruction.

It may be understood that, when obtaining the first deletion request, the user terminal may further send a notification message to the IoT terminal through the server, so that the IoT terminal may output corresponding prompt information to prompt the user that the first deletion request triggered by the user is obtained.

S207: The user terminal refuses to send the first deletion request to the server based on synchronously opening the misdeletion prevention switch of the user terminal based on the first synchronization request of the IoT terminal.

The user terminal refuses to send the first deletion request to the server based on a premise that the misdeletion prevention switch of the user terminal is synchronously opened based on the first synchronization request of the IoT terminal.

The user terminal may further refuse to delete the IoT terminal from the Internet of Things that the user terminal has accessed. The user can view the data of the IoT terminal in the device list.

In this embodiment of this application, when the user opens the misdeletion prevention switch of the IoT terminal, the misdeletion prevention switch of the user terminal is simultaneously opened. When obtaining the first deletion request triggered by the user, the user terminal refuses to send the first deletion request to the server based on the premise that the misdeletion prevention switch of the user terminal is synchronously opened based on the first synchronization request of the IoT terminal, so that the first deletion request triggered by the user cannot reach the IoT terminal. In this case, the data in the IoT terminal is not deleted, so that the IoT terminal can still be in the Internet of Things that the IoT terminal has accessed. This can prevent a case in which the IoT terminal is mistakenly deleted from the Internet of Things that the IoT terminal has accessed because the user triggers the first deletion request, and improve reliability of an IoT system.

In another implementation, after the synchronously opening the misdeletion prevention switch of the user terminal according to the first instruction in S205, the method may further include the following S208 to S212.

S208: The misdeletion prevention switch of the IoT terminal is closed by the user.

S209: The IoT terminal sends a second synchronization request to the server.

The second synchronization request is generated when the IoT terminal detects that the misdeletion prevention switch of the IoT terminal is closed by the user.

The second synchronization request is used to request the user terminal corresponding to the user account that is associated with the IoT terminal to synchronously close the misdeletion prevention switch of the user terminal. The second synchronization request may carry the user account associated with the IoT terminal, and may further carry the identification information of the IoT terminal whose misdeletion prevention switch is closed by the user.

S210: The server sends a second instruction to the user terminal in response to the second synchronization request of the IoT terminal, where the second instruction is used to instruct the user terminal to synchronously close the misdeletion prevention switch of the user terminal.

In response to the second synchronization request of the IoT terminal, the server sends the second instruction based on the user account carried in the second synchronization request, to send the second instruction to the user terminal that logs in to the user account. The second instruction is used to instruct the user terminal to synchronously close the misdeletion prevention switch of the user terminal.

When the second synchronization request further carries the identification information of the IoT terminal, the second instruction may include the identification information of the IoT terminal. The second instruction is used to instruct the user terminal to synchronously close the misdeletion prevention switch in the user terminal corresponding to the identification information of the IoT terminal.

In this way, when receiving the second instruction, the user terminal synchronously closes the misdeletion prevention switch in the user terminal corresponding to the identification information of the IoT terminal.

It may be understood that the second instruction may include identification information of one IoT terminal, or may include identification information of a plurality of IoT terminals. This is not limited herein.

S211: The user terminal obtains the second instruction sent by the server.

S212: The user terminal synchronously closes the misdeletion prevention switch of the user terminal according to the second instruction.

When the misdeletion prevention switch is a main switch, the main switch is used to control all the IoT terminals to synchronously close misdeletion prevention switches of the IoT terminals.

When the misdeletion prevention switch is branch switches corresponding to user accounts, the branch switches are used to control IoT terminals that belong to a same user account to synchronously close misdeletion prevention switches of the IoT terminals.

When the misdeletion prevention switch is branch switches corresponding to IoT terminals, the branch switches are used to control the IoT terminals to synchronously close misdeletion prevention switches of the IoT terminals.

It may be understood that, when the second instruction does not include the identification information of the IoT terminal, the user terminal may synchronously close the main switch in the user terminal. When the second instruction includes a user account, the user terminal may synchronously close a branch switch corresponding to the user account in the user terminal. When the second instruction includes the identification information of the IoT terminal, the user terminal may synchronously close a branch switch in the user terminal corresponding to the identification information of the IoT terminal. When the second instruction includes the user account and the identification information of the IoT terminal, the user terminal may synchronously close a branch switch in the user terminal corresponding to the identification information of the IoT terminal that is associated with the user account.

Optionally, after synchronously closing the misdeletion prevention switch of the user terminal in S212, the method may further include S213 and S214.

S213: The user terminal obtains a second deletion request of the user, where the second deletion request is used to request the server to delete the data of the IoT terminal.

A manner of triggering the second deletion request is the same as a manner of triggering the first deletion request. Details are not described herein again.

S214: The user terminal sends the second deletion request to the server, so that the data of the IoT terminal is deleted.

In response to the second deletion request, the user terminal sends the second deletion request to the server, so that the server deletes the data of the IoT terminal stored in the server, and sends the second deletion request to the corresponding IoT terminal, so that after receiving the second deletion request, the IoT terminal deletes the data stored in the IoT terminal.

Optionally, the user terminal deletes the IoT terminal from the device list on a device management page of the preset app in response to the second deletion request. The user cannot view related information of the IoT terminal from the device list displayed by the preset app, and cannot invoke the interaction interface corresponding to the IoT terminal shown in FIG. 2.

The server can delete a device name, a MAC address, an IP address, historical data, and the like of the IoT device.

In this embodiment, when the user closes the misdeletion prevention switch of the IoT terminal to disable misdeletion prevention protection, the user may delete the data of the IoT terminal through the user terminal, or may delete the IoT terminal from the Internet of Things that the IoT terminal has accessed.

Figure 5A:
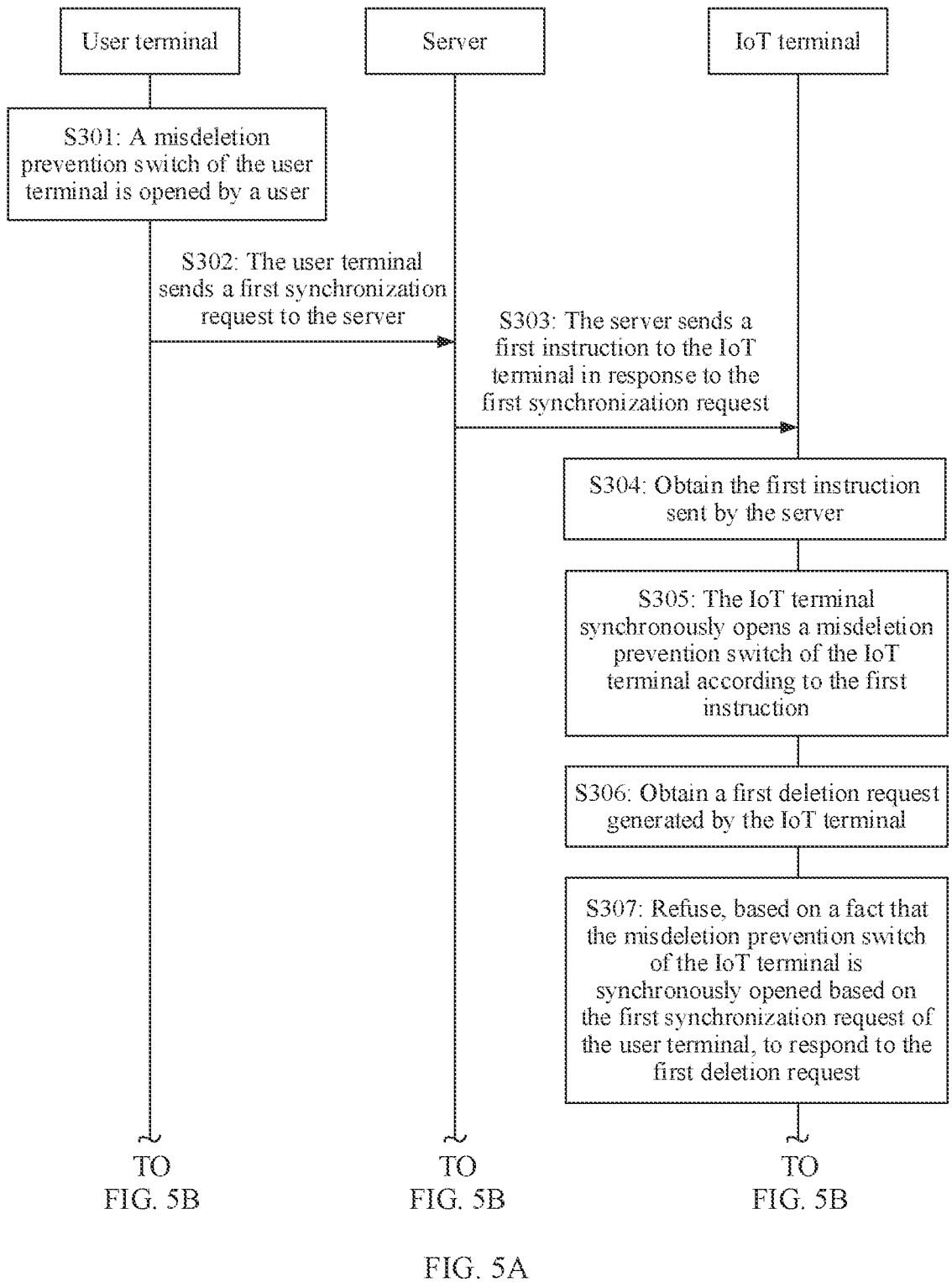
FIG. 5A and FIG. 5B are an interaction diagram of a method for preventing data misdeletion according to still another embodiment of this application.
Figure 5B:
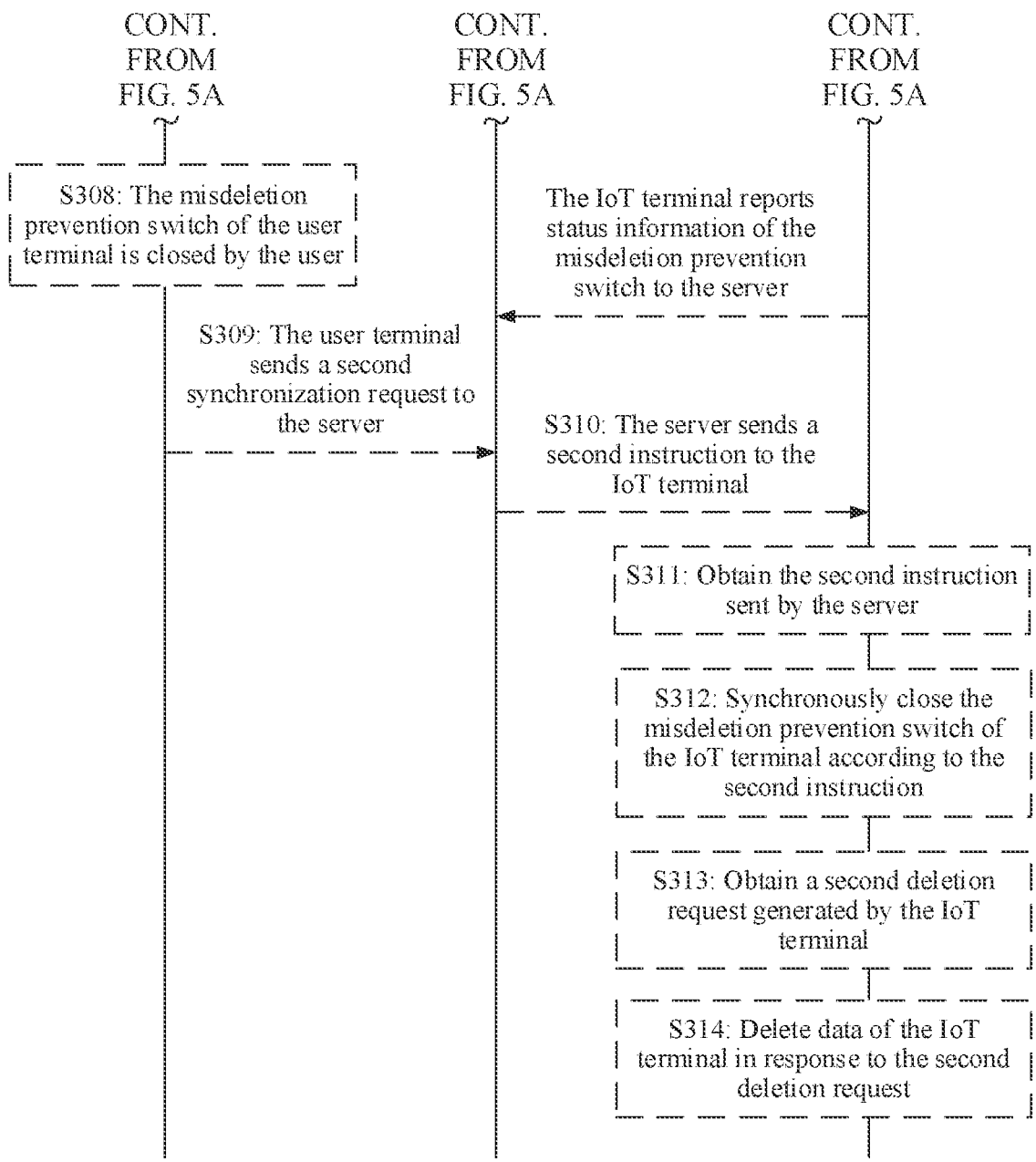

FIG. 5A and FIG. 5B are an interaction diagram of a method for preventing data misdeletion according to still another embodiment of this application. Specifically, the method for preventing data misdeletion includes the following steps.

S301: A misdeletion prevention switch of a user terminal is opened by a user.

S302: The user terminal sends a first synchronization request to a server.

The first synchronization request is used to request an IoT terminal that is associated with a user account for logging in to the user terminal to synchronously open a misdeletion prevention switch of the IoT terminal. The first synchronization request may carry the user account, and may further carry identification information of the IoT terminal associated with the user account.

The user account is used by the server to search, when receiving the first synchronization request sent by the user terminal, for the identification information of the IoT terminal associated with the user account, to send a first instruction to the IoT terminal corresponding to the found identification information.

S303: The server sends the first instruction to the IoT terminal in response to the first synchronization request, where the first instruction is used to instruct the IoT terminal to synchronously open the misdeletion prevention switch of the IoT terminal.

The server may search, based on the user account carried in the first synchronization request, for the identification information of the IoT terminal associated with the user account, and send the first instruction to the IoT terminal corresponding to the found identification information. The first instruction is used to instruct all IoT terminals associated with the user account to synchronously open misdeletion prevention switches.

When the first instruction includes the identification information of the IoT terminal carried in the first synchronization request, the server sends the first instruction to the IoT terminal based on the identification information of the IoT terminal included in the first instruction. The first instruction is used to instruct the IoT terminal corresponding to the identification information to synchronously open the misdeletion prevention switch.

It may be understood that the first instruction may include identification information of one IoT terminal, or may include identification information of a plurality of IoT terminals. This is not limited herein.

S304: The IoT terminal obtains the first instruction sent by the server.

S305: The IoT terminal synchronously opens the misdeletion prevention switch of the IoT terminal according to the first instruction.

The IoT terminal may open a physical misdeletion prevention switch disposed on the IoT terminal.

The IoT terminal may further open a virtual switch displayed in a UI of the IoT terminal, for example, open a virtual misdeletion prevention switch displayed on a liquid crystal display of the IoT terminal.

Optionally, the misdeletion prevention switch of the IoT terminal is a physical switch.

S306: The IoT terminal obtains a first deletion request generated by the IoT terminal, where the first deletion request is used to request the server to delete data of the IoT terminal.

The second deletion request is a deletion request generated after the IoT terminal opens the misdeletion prevention switch. The first deletion request is used to request the IoT terminal to delete data stored in the IoT terminal, for example, data used for establishing a communication connection to the server. The data may include any one or any combination of at least two of the following: a login key, a domain-shared key, login token (token) information, and the like.

The first deletion request may be further used to request the server to delete data of the IoT terminal stored in the server, for example, registration information, a MAC address, an IP address, and historical data of the IoT terminal.

Optionally, deleting the data of the IoT terminal includes deleting the IoT terminal from an Internet of Things that the IoT terminal has accessed.

Optionally, the first deletion request is generated by the IoT terminal in a firmware upgrade process.

For example, to enrich functions of the IoT terminal or improve performance of the IoT terminal, after a developer develops new firmware, a firmware upgrade file needs to be pushed to the IoT device through the server, to upgrade firmware in the IoT device. In the firmware upgrade process, the deletion request may be triggered when a network is abnormal or a firmware file is defective. Therefore, the deletion request may alternatively be triggered by the IoT terminal in the firmware upgrade process.

Firmware (Firmware) is a program written into an erasable read-only memory (Eraseable Read Only Memory, EROM) or a programmable read-only memory (Erasable Programmable ROM, EPROM), and is generally understood as "fixed software". Firmware is completely different from common software. Firmware is a program fixed in an integrated circuit and is responsible for controlling and coordinating functions of the integrated circuit. Firmware acts as the most basic and bottom-level software of a system. In a hardware device, firmware is the soul of the hardware device. The firmware determines functions and performance of the hardware device.

Firmware upgrade is different from software upgrade and hardware upgrade. Firmware upgrade is for the entire device, such as improving smoothness, adding new a function, or removing a known defect or bug (bug). Software upgrade is only for software. Even if the software is upgraded, the software functions are changed, the software experience is improved, or the firmware is upgraded. Simply, firmware is the primary and software is the secondary. The software needs to be upgraded based on a version of the firmware. Hardware upgrade is usually performed to upgrade weak items of the hardware, and is implemented by replacing or adding hardware components. For example, a processor is replaced to improve a data processing capability, or a memory card is replaced or added to improve a data storage capacity.

Optionally, to help the user learn in time that the IoT terminal obtains the deletion request when the misdeletion prevention switch is opened, after S306, the method may further include: outputting prompt information, where the prompt information is used to prompt the user that the first deletion request is obtained.

The IoT terminal may prompt, in a preset prompt manner, the user that the first deletion request is obtained.

Optionally, the outputting prompt information may include: outputting voice prompt information, or controlling an indicator to blink.

For example, the IoT terminal may prompt, by playing preset voice prompt information, the user that the first deletion request is obtained, so that the user analyzes and processes a cause of the deletion request. For example, the voice prompt information may be "The deletion request has been obtained. Are you sure you want to delete the device?". However, the voice prompt information is not limited thereto, and may be set based on an actual situation. This is not limited herein.

For example, when an indicator is correspondingly set for the misdeletion prevention switch, the indicator may be further controlled to blink in a preset blinking manner, to prompt the user that the first deletion request is obtained. The preset blinking manner may be blinking a plurality of times at a preset frequency, or controlling the indicator to alternately blink in different colors, or blink in another color. The another color is a color that is different from a color corresponding to a normal operating state.

It may be understood that, when obtaining the first deletion request, the IoT terminal may further send a notification message to the user terminal through the server, to prompt the user that the IoT terminal generates the first deletion request, so that the user performs fault analysis and processing.

S307: The IoT terminal refuses to respond to the first deletion request based on synchronously opening the misdeletion prevention switch of the IoT terminal based on the first synchronization request of the user terminal.

Based on a premise that the misdeletion prevention switch of the user terminal is synchronously opened based on the first synchronization request of the IoT terminal, the IoT terminal refuses to respond to the first deletion request, and does not delete the data stored in the IoT terminal. The data that is stored in the IoT terminal and used to establish the communication connection to the server is also not deleted, and the IoT terminal is not deleted from the Internet of Things that the IoT terminal has accessed.

It may be understood that, before refusing to respond to the first deletion request, the IoT terminal may further determine that the misdeletion prevention switch of the IoT terminal is opened. For example, when the misdeletion prevention switch is a physical switch, level information corresponding to the misdeletion prevention switch is read. When the level information corresponds to a high level, the misdeletion prevention switch of the IoT terminal is opened. When the level information corresponds to a low level, the misdeletion prevention switch of the IoT terminal is closed. When a corresponding indicator is set for the physical misdeletion prevention switch, whether the indicator is turned on can be queried, to determine whether the misdeletion prevention switch is opened.

When the misdeletion prevention switch is a virtual switch, the IoT terminal may further query the identification information corresponding to the misdeletion prevention switch, to determine whether the misdeletion prevention switch is opened, or may query whether an indication icon corresponding to the virtual misdeletion prevention switch is turned on, to determine whether the misdeletion prevention switch is opened.

In this embodiment of this application, when the user opens the misdeletion prevention switch of the user terminal, the misdeletion prevention switch of the IoT terminal is synchronously opened. When obtaining the first deletion request generated by the IoT terminal, the IoT terminal refuses to respond to the first deletion request based on the premise that the misdeletion prevention switch of the IoT terminal is synchronously opened based on the first synchronization request of the user terminal. Even if the IoT terminal triggers the deletion request, the data of the IoT terminal stored in the IoT terminal is not deleted, and the IoT terminal is still in the Internet of Things that the IoT terminal has accessed. This can prevent a case in which the IoT terminal is mistakenly deleted from the Internet of Things that the IoT terminal has accessed because the IoT terminal triggers the first deletion request, and improve the reliability of the IoT system.

Optionally, to facilitate the server to record status information of the misdeletion prevention switch of the IoT terminal, the method for preventing data misdeletion further includes: The IoT terminal reports the status information of the IoT terminal to the server, where the status information is used by the server to update and record status information of the misdeletion prevention switch of the IoT terminal.

It may be understood that the IoT terminal may report the status information of the misdeletion prevention switch in real time, or may report the status information of the misdeletion prevention switch in a preset periodicity, or may report the status information immediately when a status of the misdeletion prevention switch changes.

Optionally, to save software and hardware resources of the IoT terminal and reduce power consumption of the IoT terminal, the status information is reported by the IoT terminal in the preset periodicity, and/or is reported when the status of the misdeletion prevention switch of the IoT terminal changes.

For example, the IoT terminal reports the status information of the misdeletion prevention switch of the IoT terminal to the server once a day, and a specific time point for reporting the working status information may be fixed, or may not be fixed. The preset periodicity may be 1 hour or 4 hours, or may be set based on an actual requirement. This is not limited herein, In this manner, it can be ensured that the status information of the IoT terminal and status information of the misdeletion prevention switch of the user terminal that are recorded by the server are synchronized in real time with that of the misdeletion prevention switch of the IoT terminal, to avoid misdeletion caused by untimely update of the status information of the misdeletion prevention switch of the IoT terminal.

It may be understood that the user may control, through the user terminal, the IoT terminal to change the status of the misdeletion prevention switch, or the user may control the IoT terminal to change a status of the misdeletion prevention switch of the IoT terminal.

Figure 6:
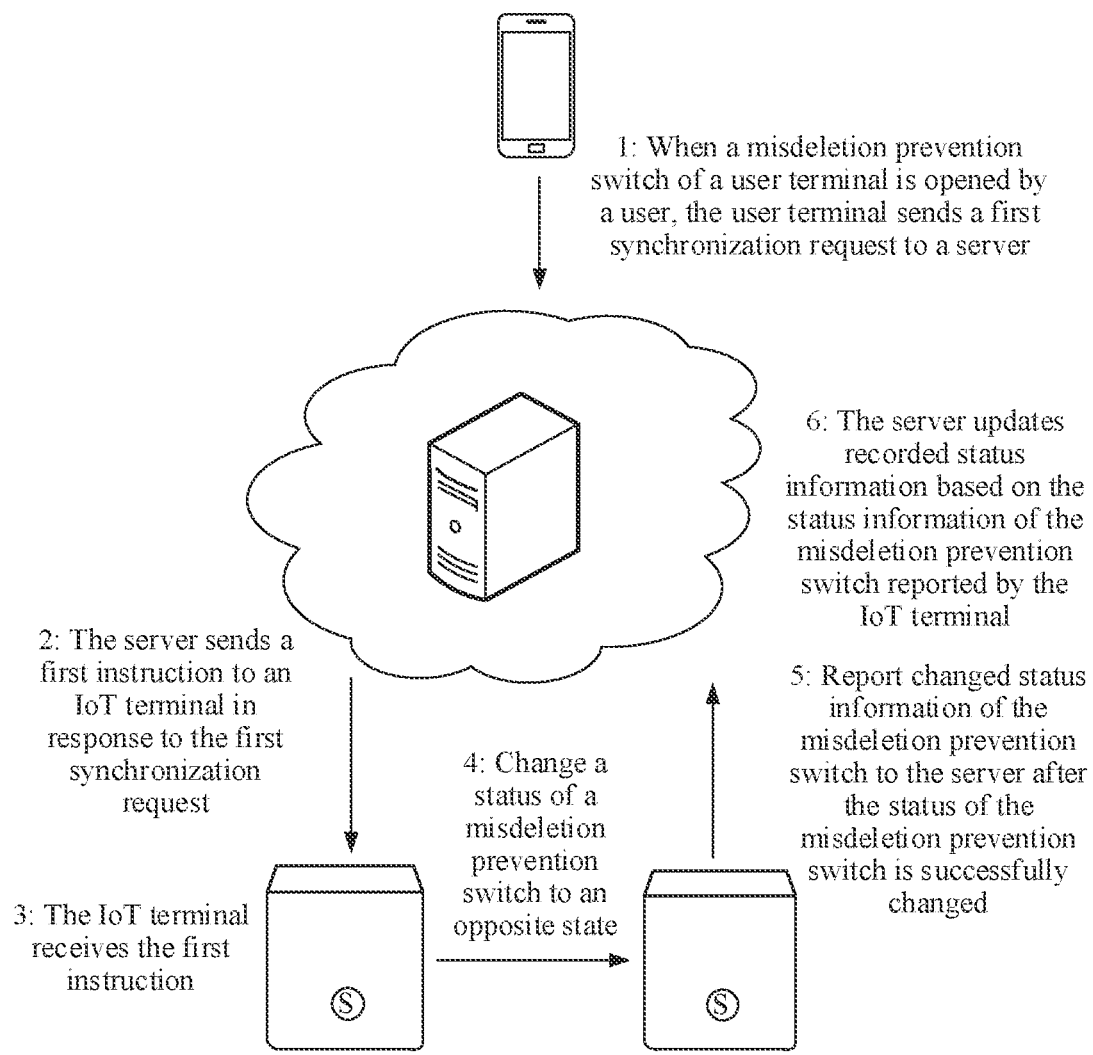
FIG. 6 is a schematic diagram of an application scenario in which a user controls an IoT terminal through a user terminal according to an embodiment of this application.

FIG. 6 is a schematic diagram of an application scenario in which the user controls the IoT terminal through the user terminal according to an embodiment of this application. As shown in FIG. 6, when detecting that the misdeletion prevention switch of the IoT terminal is synchronously opened based on the synchronization request of the user terminal, a smart sound box reports status information of a misdeletion prevention switch of the smart sound box to the server.

Figure 7:
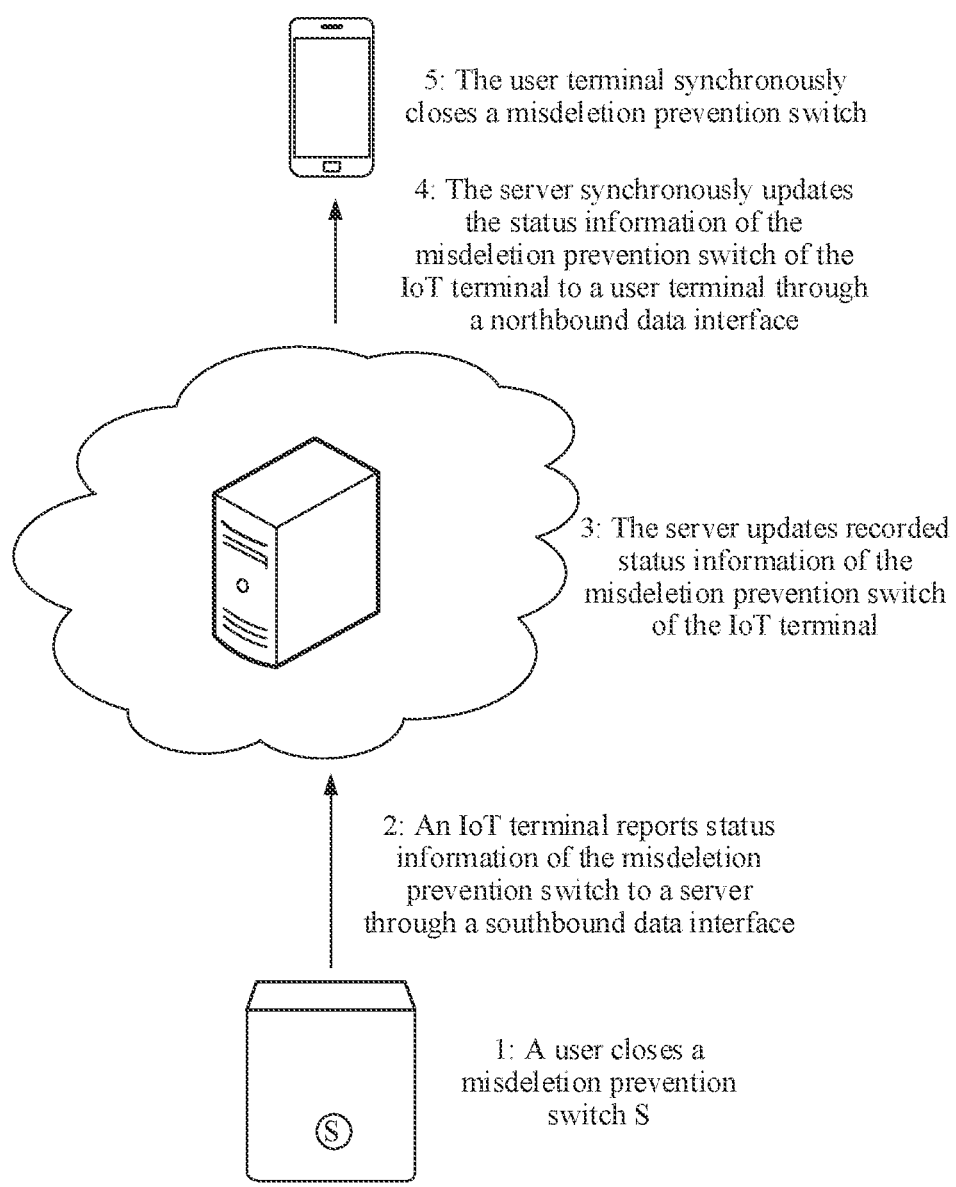
FIG. 7 is a schematic diagram of an application scenario in which an IoT terminal reports status information of a misdeletion. prevention switch according to an embodiment of this application.

FIG. 7 is a schematic diagram of an application scenario in which the IoT terminal reports the status information of the misdeletion prevention switch according to an embodiment of this application. As shown in FIG. 7, after the misdeletion prevention switch of the smart sound box is opened, when detecting that the user closes the misdeletion prevention switch of the smart sound box, the smart sound box reports the status information of the misdeletion prevention switch of the smart sound box to the server, and synchronously updates the status information of the misdeletion prevention switch of the smart sound box to the user terminal, and the user terminal synchronously closes a misdeletion prevention switch corresponding to the smart sound box in the user terminal.

Optionally, after the synchronously opening the misdeletion prevention switch of the IoT terminal according to the first instruction in S305, the method may further include the following S308 to S312.

S308: The misdeletion prevention switch of the user terminal is closed by the user.

S309: The user terminal sends a second synchronization request to a server.

The second synchronization request is used to request the IoT terminal that is associated with the user account for logging in to the user terminal to synchronously close the misdeletion prevention switch of the IoT terminal. The second synchronization request may carry the user account, and may further carry the identification information of the IoT terminal associated with the user account.

The user account is used by the server to search, when receiving the second synchronization request sent by the user terminal, for the identification information of the IoT terminal associated with the user account, to send a second instruction to the IoT terminal corresponding to the found identification information.

S310: The server sends the second instruction to the IoT terminal in response to the second synchronization request.

The server may search, based on the user account carried in the second synchronization request, for the identification information of the IoT terminal associated with the user account, and send the second instruction to the IoT terminal corresponding to the found identification information. The second instruction is used to instruct all the IoT terminals associated with the user account to synchronously close the misdeletion prevention switches.

When the second instruction includes the identification information of the IoT terminal carried in the second synchronization request, the server sends the second instruction to the IoT terminal based on the identification information of the IoT terminal included in the second instruction. The second instruction is used to instruct the IoT terminal corresponding to the identification information to synchronously close the misdeletion prevention switch.

It may be understood that the second instruction may include identification information of one IoT terminal, or may include identification information of a plurality of IoT terminals. This is not limited herein.

S311: The IoT terminal obtains the second instruction sent by the server.

S312: The IoT terminal synchronously closes the misdeletion prevention switch of the IoT terminal according to the second instruction.

The IoT terminal may close the physical misdeletion prevention switch disposed on the IoT terminal.

The IoT terminal may further close the virtual switch displayed in the UI of the IoT terminal, for example, close the virtual misdeletion prevention switch displayed on the liquid crystal display of the IoT terminal.

When an indicator is correspondingly set on the misdeletion prevention switch, the indicator may also be turned off synchronously.

Optionally, after the synchronously closing the misdeletion prevention switch of the IoT terminal in S312, the method further includes the following S313 and S314.

S313: The IoT terminal obtains a second deletion request generated by the IoT terminal, where the second deletion request is used to request the server to delete the data of the IoT terminal.

The second deletion request is a deletion request generated after the IoT terminal closes the misdeletion prevention switch.

S314: The IoT terminal deletes the data of the IoT terminal in response to the second deletion request.

When the misdeletion prevention switch of the IoT terminal is in a closed state, if the IoT terminal receives the second deletion request, the IoT terminal deletes the data stored in the IoT terminal. The data stored in the IoT terminal includes the data used for establishing the communication connection to the server. Therefore, after deleting the data stored in the IoT terminal, the IoT terminal cannot establish the communication connection to the server, and cannot access the Internet of Things. When detecting that the data of the IoT terminal cannot be obtained within preset duration, the server indicates the user terminal to delete the IoT terminal from the Internet of Things that the IoT terminal has accessed. The IoT terminal may further send the second deletion request to the server in response to the second deletion request, so that the server deletes the data of the IoT terminal stored in the server.

For example, when the IoT terminal is a smart sound box, the smart sound box deletes, in response to the second deletion request, data (for example, information such as a login key, a domain-shared key, and a login token (token)) that is stored in the smart sound box and used to establish a communication connection to the server, or clear local data. The smart sound box may further send the second deletion request to the server, so that when receiving the second deletion request, the server deletes related data of the smart sound box stored in the server, and indicates the user terminal to delete the smart sound box from an Internet of Things that the smart sound box has accessed.

In this embodiment, if the user closes the misdeletion prevention switch of the user terminal to disable misdeletion prevention, when obtaining the deletion request generated by the IoT terminal, the IoT terminal clears the data stored in the IoT terminal, and deletes the IoT terminal from the Internet of Things that has accessed.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

Figure 8:
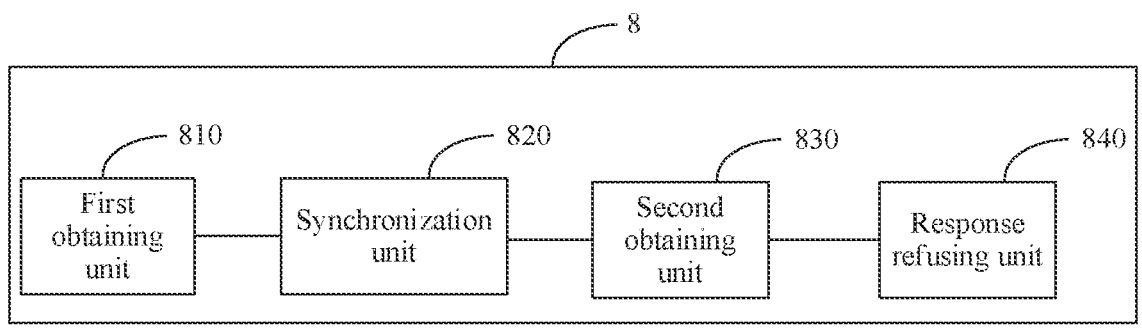
FIG. 8 is a schematic diagram of a structure of an apparatus for preventing data misdeletion according to an embodiment of this application.
Figure 9:
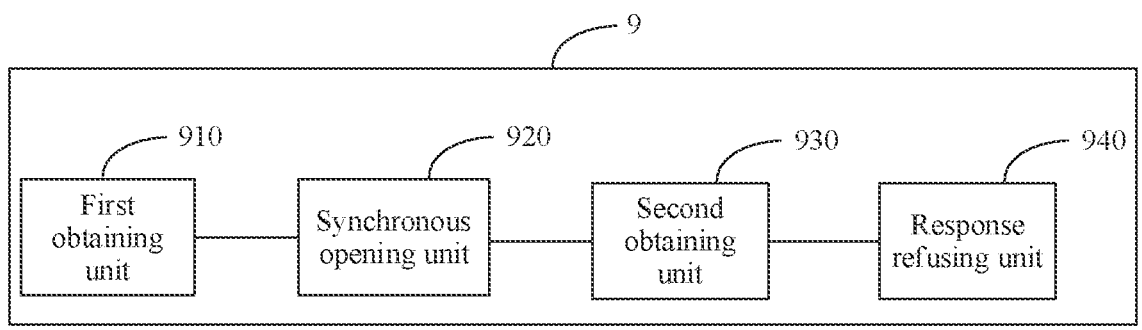
FIG. 9 is a schematic diagram of a structure of an apparatus for preventing data misdeletion according to another embodiment of this application.

Corresponding to the method for preventing data misdeletion applied to the server in the foregoing embodiment, FIG. 8 is a schematic block diagram of a structure of an apparatus for preventing data misdeletion according to an embodiment of this application. For ease of description, only a part related to this embodiment of this application is shown. In this embodiment, units included in the apparatus for preventing data misdeletion are configured to perform the steps performed by the server in the embodiment corresponding to FIG. 3. For details, refer to related descriptions in FIG. 3. Details are not described herein again. The apparatus 8 for preventing data misdeletion may include:

a first obtaining unit 810, configured to obtain a synchronization request sent by a user terminal, where the synchronization request is sent by the user terminal to the server when the user terminal detects that a misdeletion prevention switch of the user terminal is opened by a user, and is used to request an IoT terminal to synchronously open a misdeletion prevention switch of the IoT terminal;

a synchronization unit 820, configured to indicate, in response to the synchronization request, the IoT terminal to synchronously open the misdeletion prevention switch of the IoT terminal;

a second obtaining unit 830, configured to obtain a deletion request generated by the server, where the deletion request is used to request the server to delete data of the IoT terminal; and a response refusing unit 840, configured to refuse to respond to the deletion request based on synchronously opening the misdeletion prevention switch of the IoT terminal based on the synchronization request of the user terminal.

Optionally, the misdeletion prevention switch of the user terminal is displayed in a user interface UI of the user terminal.

Optionally, the misdeletion prevention switch of the user terminal corresponds to the IoT terminal.

Optionally, the misdeletion prevention switch of the IoT terminal is a physical switch.

Optionally, the deletion request is generated when the server works in an abnormal state.

Optionally, deleting the data of the IoT terminal includes deleting the IoT terminal from an Internet of Things that the IoT terminal has accessed.

Optionally, the apparatus for preventing data misdeletion may further include:

a recording unit, configured to record status information of the misdeletion prevention switch of the IoT terminal after the synchronization unit indicates, in response to the synchronization request, the IoT terminal to synchronously open the misdeletion prevention switch of the IoT terminal.

Optionally, the apparatus for preventing data misdeletion may further include:

a determining unit, configured to: before the response refusing unit refuses to respond to the deletion request, determine that the misdeletion prevention switch of the IoT terminal is opened.

Optionally, the determining unit is specifically configured to: after the recording unit records the status information of the misdeletion prevention switch of the IoT terminal, and before the response refusing unit refuses to respond to the deletion request, determine, based on the status information, that the misdeletion prevention switch of the IoT terminal is opened.

Optionally, when the status information is recorded by using deletion protection identifier information, the determining unit is specifically configured to determine, based on the deletion protection identifier information, that the misdeletion prevention switch of the IoT terminal is opened.

Optionally, when the status information is recorded by using a deletion protection field, the determining unit is specifically configured to determine, based on the deletion protection field, that the misdeletion prevention switch of the IoT terminal is opened.

Optionally, the apparatus for preventing data misdeletion further includes:

a status updating unit, configured to: after the recording unit records the status information of the misdeletion prevention switch of the IoT terminal, update the recorded status information based on status information of the misdeletion prevention switch reported by the IoT terminal.

Optionally, the reported status information is reported by the IoT terminal in a preset periodicity, and/or is reported when a status of the misdeletion prevention switch of the IoT terminal changes.

In this embodiment, the apparatus 8 for preventing data misdeletion may be a server, or a chip in the server, or a function module integrated in the server. The chip or the function module may be located in a control center (for example, a console) of the server, to control the server to implement the method for preventing data misdeletion provided in this application.

It should be noted that content such as information exchange and execution processes between the foregoing apparatuses/units is based on a same concept as the embodiment of the method for preventing data misdeletion that is applied to the server in this application. For specific functions and technical effects, refer to the part of the embodiment of the method for preventing data misdeletion that is applied to the server. Details are not described herein again.

Corresponding to the method for preventing data misdeletion applied to the user terminal in the foregoing embodiment, FIG. 7 is a schematic block diagram of a structure of an apparatus for preventing data misdeletion according to another embodiment of this application. For ease of description, only a part related to this embodiment of this application is shown. In this embodiment, units included in the apparatus for preventing data misdeletion are configured to perform the steps performed by the user terminal in the embodiment corresponding to FIG. 4A and FIG. 4B. For details, refer to related descriptions in. FIG. 4A and FIG. 4B. Details are not described herein again. The apparatus 9 for preventing data misdeletion may include:

a first obtaining unit 910, configured to obtain a first instruction sent by a server, where the first instruction is used to instruct the user terminal to synchronously open a misdeletion prevention switch of the user terminal, and is sent by the server in response to a first synchronization request of an IoT terminal, and the first synchronization request is generated when the IoT terminal detects that a misdeletion prevention switch of the IoT terminal is opened by a user;

a synchronization opening unit 920, configured to synchronously open the misdeletion prevention switch of the user terminal according to the first instruction;

a second obtaining unit 930, configured to obtain a first deletion request of the user, where the first deletion request is used to request the server to delete data of the IoT terminal, and a response refusing unit 940, configured to refuse to send the first deletion request to the server based on synchronously opening the misdeletion prevention switch of the user terminal based on the first synchronization request of the IoT terminal.

Optionally, the misdeletion prevention switch of the user terminal is displayed in a UI of the user terminal.

Optionally, the misdeletion prevention switch of the user terminal corresponds to the IoT terminal.

Optionally, the apparatus for preventing data misdeletion may further include: a determining unit, configured to: before the response refusing unit refuses to send the first deletion request to the server, determine that the misdeletion prevention switch displayed in the UI of the user terminal is opened.

Optionally, the first deletion request is triggered by the user through the UI of the user terminal.

Optionally, deleting the data of the IoT terminal includes deleting the IoT terminal from an Internet of Things that the IoT terminal has accessed.

Optionally, the apparatus for preventing data misdeletion further includes: a prompting unit, configured to: after the second obtaining unit obtains the first deletion request of the user, prompt, in a preset prompt manner, the user that the first deletion request is obtained.

Optionally, the prompting unit is specifically configured to pop up a prompt dialog box, where the prompt dialog box is used for the user to determine whether to delete the IoT terminal from the Internet of Things that the IoT terminal has accessed.

Optionally, the apparatus for preventing data misdeletion further includes: a third obtaining unit, configured to: after the synchronization opening unit synchronously opens the misdeletion prevention switch of the user terminal according to the first instruction, obtain a second instruction sent by the server, where the first instruction is used to instruct the user terminal to synchronously close the misdeletion prevention switch of the user terminal, and is sent by the server in response to a second synchronization request of the IoT terminal, and the second synchronization request is generated when the IoT terminal detects that the misdeletion prevention switch of the IoT terminal is closed by the user and a synchronous closing unit, configured to synchronously close the misdeletion prevention switch of the user terminal according to the second instruction.

Optionally, the apparatus for preventing data misdeletion further includes:

a fourth obtaining unit, configured to obtain a second deletion request of the user after the synchronization closing unit synchronously closes the misdeletion prevention switch of the user terminal, where the second deletion request is used to request the server to delete data of the IoT terminal; and a sending unit, configured to send the second deletion request to the server, so that the data of the IoT terminal is deleted.

In this embodiment, the apparatus 9 for preventing data misdeletion may be a user terminal, or a chip in the user terminal, or a function module integrated in the user terminal. The chip or the function module may be located in a control center (for example, a console) of the user terminal, to control the user terminal to implement the method for preventing data misdeletion provided in this application.

It should be noted that content such as information exchange and execution processes between the foregoing apparatuses/units is based on a same concept as the embodiment of the method for preventing data misdeletion that is applied to the user terminal in this application. For specific functions and technical effects, refer to the part of the embodiment of the method for preventing data misdeletion that is applied to the user terminal. Details are not described herein again.

Figure 10:
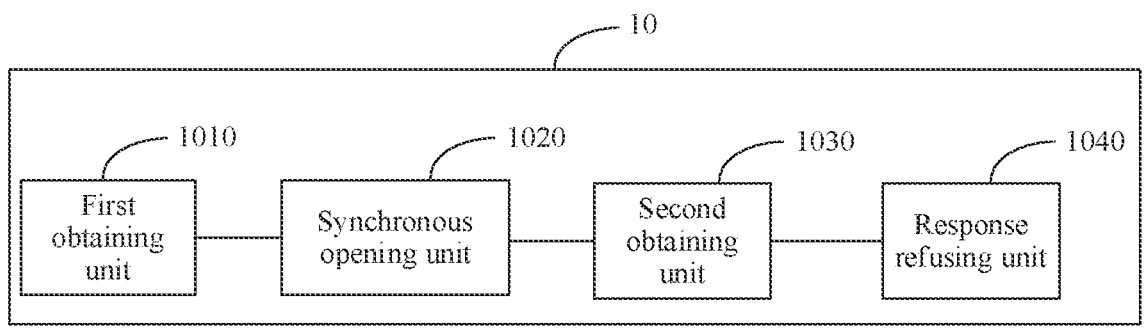
FIG. 10 is a schematic diagram of a structure of an apparatus for preventing data misdeletion according to still another embodiment of this application.

Corresponding to the method for preventing data misdeletion applied to the IoT terminal in the foregoing embodiment, FIG. 10 is a schematic block diagram of a structure of an apparatus for preventing data misdeletion according to still another embodiment of this application. For ease of description, only a part related to this embodiment of this application is shown. In this embodiment, units included in the apparatus for preventing data misdeletion are configured to perform the steps performed by the IoT terminal in the embodiment corresponding to FIG. 5A and FIG. 5B. For details, refer to related descriptions in FIG. 5A and FIG. 5B. Details are not described herein again. The apparatus 10 for preventing data misdeletion may include:

a first obtaining unit 1010, configured to obtain a first instruction sent by a server, where the first instruction is used to instruct the IoT terminal to synchronously open a misdeletion prevention switch of the IoT terminal, and is sent by the server in response to a first synchronization request of a user terminal, and the first synchronization request is generated when the user terminal detects that a misdeletion prevention switch of the user terminal is opened by a user;

a synchronization opening unit 1020, configured to synchronously open the misdeletion prevention switch of the IoT terminal according to the first instruction;

a second obtaining unit 1030 configured to obtain a first deletion request generated by the IoT terminal, where the first deletion request is used to request the server to delete data of the IoT terminal; and a response refusing unit 1040, configured to refuse to respond to the first deletion request based on synchronously opening the misdeletion prevention switch of the IoT terminal based on the first synchronization request of the user terminal.

Optionally, the misdeletion prevention switch of the IoT terminal is a physical switch.

Optionally, deleting the data of the IoT terminal includes deleting the IoT terminal from an Internet of Things that the IoT terminal has accessed.

Optionally, the first deletion request is generated by the IoT terminal in a firmware upgrade process.

Optionally, the apparatus for preventing data misdeletion further includes: a prompting unit, configured to output prompt information after the second obtaining unit obtains the first deletion request generated by the IoT terminal, where the prompt information is used to prompt the user that the first deletion request is obtained.

Optionally, the prompting unit is specifically configured to output voice prompt information, or control an indicator to blink.

Optionally, the apparatus 10 for preventing data misdeletion further includes:

a status reporting unit, configured to report status information of the IoT terminal to the server, where the status information is used by the server to update and record status information of the misdeletion prevention switch of the IoT terminal.

Optionally, the status information is reported by the IoT terminal in a preset periodicity, and/or is reported when a status of the misdeletion prevention switch of the IoT terminal changes.

Optionally, the apparatus 10 for preventing data misdeletion further includes:

a third obtaining unit, configured to: after the synchronization opening unit synchronously opens the misdeletion prevention switch of the IoT terminal according to the first instruction, obtain a second instruction sent by the server, where the second instruction is used to instruct the IoT terminal to synchronously close the misdeletion prevention switch of the IoT terminal, and is sent by the server in response to a second synchronization request of the user terminal, and the second synchronization request is generated when the user terminal detects that the misdeletion prevention switch of the user terminal is closed by the user; and a synchronous closing unit, configured to synchronously close the misdeletion prevention switch of the IoT terminal according to the second instruction.

Optionally, the apparatus 10 for preventing data misdeletion further includes:

a fourth obtaining unit, configured to obtain a second deletion request generated by the IoT terminal after the synchronization closing unit synchronously closes the misdeletion prevention switch of the IoT terminal, where the second deletion request is used to request the server to delete data of the IoT terminal; and a deletion unit, configured to delete the data of the IoT terminal in response to the second deletion request.

In this embodiment, the apparatus 10 for preventing data misdeletion may be an IoT terminal, or a chip in the IoT terminal, or a function module integrated in the IoT terminal. The chip or the function module may be located in a control center (for example, a console) of the IoT terminal, to control the IoT terminal to implement the method for preventing data misdeletion provided in this application.

It should be noted that content such as information exchange and execution processes between the foregoing apparatuses/units is based on a same concept as the embodiment of the method for preventing data misdeletion that is applied to the IoT terminal in this application. For specific functions and technical effects, refer to the part of the embodiment of the method for preventing data misdeletion that is applied to the IoT terminal. Details are not described herein again.

Figure 11:
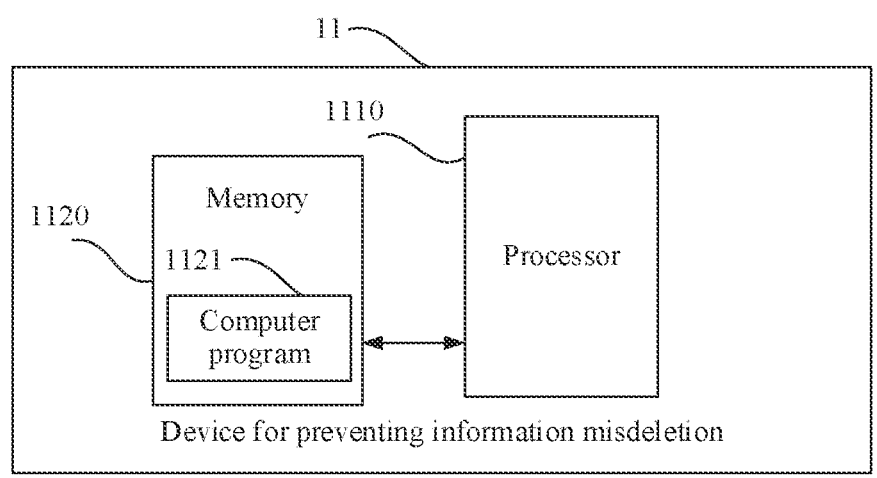
FIG. 11 is a schematic diagram of a structure of a device for preventing data misdeletion according to an embodiment of this application.

FIG. 11 is a schematic diagram of a structure of a device for preventing data misdeletion according to an embodiment of this application. As shown in FIG. 11, the device 11 for preventing data misdeletion includes: at least one processor 1110 (only one processor 1110 is shown in FIG. 11), a memory 1120, and a computer program 1121 that is stored in the memory 1120 and that can be run on the at least one processor 1110. When executing the computer program 1121, the processor 1110 implements the steps in any one of the foregoing method embodiments for preventing data misdeletion.

When the device for preventing data misdeletion is a server, when the processor 1110 invokes the computer program 1121 stored in the memory 1120, the server is enabled to perform the steps performed by the server in the embodiment corresponding to FIG. 3.

When the device for preventing data misdeletion is a user terminal, when the processor 1110 invokes the computer program 1121 stored in the memory 1120, the user terminal is enabled to perform the steps performed by the user terminal in the embodiment corresponding to FIG. 4A and FIG. 4B. The user terminal may be a wearable device, for example, a mobile phone, a notebook computer, or a smartwatch.

When the device for preventing data misdeletion is an IoT terminal, when the processor 1110 invokes the computer program 1121 stored in the memory 1120, the IoT terminal is enabled to perform the steps performed by the IoT terminal in the embodiment corresponding to FIG. 5A and FIG. 5B.

The device 11 for preventing data misdeletion may include, but is not limited to, the processor 1110 and the memory 1120. A person skilled in the art may understand that FIG. 11 is merely an example of the device 11 for preventing data misdeletion, and does not constitute a limitation on the device 11 for preventing data misdeletion. The device 11 for preventing data misdeletion may include more or fewer components than those shown in the figure, or a combination of some components, or different components, for example, may further include an input/output device, a network access device, and the like.

The processor 1110 may be a central processing unit (Central Processing Unit, CPU), or may be another general-purpose processor, a digital signal processor (Digital Signal Processor, DSP), an application-specific integrated circuit (Application Specific Integrated Circuit, ASIC), a field-programmable gate array (Field-Programmable Gate Array, FPGA), or another programmable logic device, a discrete gate, a transistor logic device, a discrete hardware component, or the like. The general-purpose processor may be a microprocessor, or the processor may be any conventional processor or the like.

In some embodiments, the memory 1120 may be an internal storage unit of the device 11 for preventing data misdeletion, for example, a hard disk or a memory of the device 11 for preventing data misdeletion. In some other embodiments, the memory 1120 may alternatively be an external storage device of the device 11 for preventing data misdeletion, for example, a smart media card (Smart Media Card, SMC), a secure digital (Secure Digital, SD) card, and a flash card (Flash Card) on the device 11 for preventing data misdeletion. Further, the memory 1120 may include both an internal storage unit and an external storage device of the device 11 for preventing data misdeletion. The memory 1120 is configured to store an operating system, an application, a boot loader (Boot Loader), data, and another program, for example, program code of the computer program. The memory 1120 may further be configured to temporarily store data that has been output or is to be output.

It may be clearly understood by a person skilled in the art that, for convenient and brief description, division of the foregoing function units and modules is merely used as an example for illustration. In actual application, the foregoing functions can be allocated to different function units and modules and implemented based on a requirement, that is, an inner structure of the apparatus is divided into different function units and modules to implement all or some of the functions described above. Functional units and modules in embodiments may be integrated into one processing unit, or each of the units may exist alone physically, or two or more units may be integrated into one unit. The integrated unit may be implemented in a form of hardware, or may he implemented in a form of a software functional unit. In addition, specific names of the function units or modules are merely provided for distinguishing the units from one another, but are not intended to limit the protection scope of this application. For a specific working process of the units or modules in the foregoing system, refer to a corresponding process in the foregoing method embodiments. Details are not described herein again.

In the foregoing embodiments, the description of each embodiment has respective focuses. For a part that is not described in detail in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

In embodiments provided in this application, it should be understood that the disclosed apparatus and method may be implemented in other manners. For example, the described system embodiment is merely an example. For example, division into the modules or units is merely logical function division and may be other division in an actual implementation. For example, a plurality of units or components may be combined or integrated into another system, or some features may be ignored or not performed. in addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts displayed as units may or may not be physical units, that is, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically; or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code, and the computer program code may be in a source code form, an object code form, an executable file form, some intermediate forms, or the like. The computer-readable medium may include at least any entity or apparatus, a recording medium, a computer memory, a read-only memory (Read-Only Memory, ROM), and a random access memory (Random Access Memory, RAM), an electrical carrier signal, a telecommunications signal, and a software distribution medium that can carry the computer program code to the device 11 for preventing data misdeletion, for example, a USB flash drive, a removable hard disk, a magnetic disk, or an optical disk. In some jurisdictions, according to legislation and patent practice, a computer-readable medium cannot be an electrical carrier signal or a telecommunication signal.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A method for preventing data misdeletion, wherein the method is implemented by a server, and wherein the method comprises:
obtaining, from a user terminal, a synchronization request when the user terminal detects that a first misdeletion prevention switch of the user terminal is opened by a user;

instructing, in response to the synchronization request, an Internet of Things (IoT) terminal to synchronously open a second misdeletion prevention switch of the IoT terminal;

obtaining a deletion request generated by the server, wherein the deletion request requests the server to delete data of the IoT terminal; and refusing to respond to the deletion request based on synchronously opening the second misdeletion prevention switch based on the synchronization request.

2. The method of claim 1, further comprising generating the deletion request when the server works in an abnormal state.

3. The method of claim 1, wherein the data of the IoT terminal comprises deleting the IoT terminal from an IoT that the IoT terminal has accessed.

4. The method of claim 1, wherein after instructing the IoT terminal to synchronously open the second misdeletion prevention switch, the method further comprises recording first status information of the second misdeletion prevention switch.

5. The method of claim 4, wherein before refusing to respond to the deletion request, the method further comprises: determining, based on the first status information, that the second misdeletion prevention switch is opened.

6. The method of claim 5,
recording the first status information using deletion protection identifier information; and
determining, based on the deletion protection identifier information, that the second misdeletion prevention switch is opened.

7. The method of claim 5, further comprising:
recording the fast status information using a deletion protection field; and
determining, based on the deletion protection field, that the second misdeletion prevention switch is opened.

8. The method of claim 4, wherein after recording the first status information, the method further comprises:
obtaining, from the IoT terminal, second status information of the second misdeletion prevention swithch; and
updating, based on the second status information, the first status information.

9. The method of claim 8, further comprising further obtaining, from the IoT terminal, the second status information when a status of the second misdeletion prevention switch has changed.

10. The method of claim 8, further comprising obtaining, from the IoT terminal in a preset periodicity, the second status information.

11. A method for preventing data misdeletion, wherein the method is implemented by a user terminal, and wherein the method comprises:
obtaining, from a server, a first instruction instructing the user terminal to synchronously open a first misdeletion prevention switch of the user terminal, wherein the server sends the first instruction in response to detecting a second misdeletion prevention switch of an Internet of Things (IoT) terminal is opened by a user;
synchronously opening, according to the first instruction, the first misdeletion prevention switch of the user terminal;
obtaining a first deletion request of the user, wherein the first deletion request requests the server to delete data of the IoT terminal; and
refusing to send the first deletion request to the server based on synchronously opening the first misdeletion prevention switch of the user terminal.

12. The method of claim 11, wherein before refusing to send the first deletion request, the method further comprises determining that the first misdeletion prevention switch displayed in a user interface (UI) of the user terminal is opened.

13. The method of claim 11, further comprising triggering, by the user through a user interface (UI) of the user terminal, the first deletion request.

14. The method of claim 11, wherein deleting the data of the IoT terminal comprises deleting the IoT terminal from an IoT that the IoT terminal has accessed.

15. The method of claim 11, wherein after obtaining the first deletion request, the method further comprises prompting, in a preset prompt manner, the user that the first deletion request is obtained.

16. The method of claim 15, further comprising popping up a prompt dialog box for the user to determine whether to delete the IoT terminal from an IoT that the IoT terminal has accessed.

17. The method of claim 11, wherein after synchronously opening the first misdeletion prevention switch of the user terminal, the method further comprises:
obtaining, from the server, a second instruction instructing the user terminal to synchronously close the first misdeletion prevention switch of the user terminal, wherein the server sends the second instruction in response to detecting that the second misdeletion prevention switch of the IoT terminal is closed by the user; and
synchronously closing, according to the second instruction, the first misdeletion prevention switch of the user terminal.

18. The method of claim 17, wherein after synchronously closing the first misdeletion prevention switch of the user terminal, the method further comprises:
obtaining a second deletion request of the user, wherein the second deletion request requests the server to delete the data of the IoT terminal; and
sending, to the server, the second deletion request to delete the data of the IoT terminal.

19. A device for preventing data misdeletion comprising:
a memory configured to store a computer program; and
a processor coupled to the memory, wherein when executed by the processor, the computer program causes the device to:
obtain, from a user terminal, a synchronization request when the user terminal detects that a first misdeletion prevention switch of the user terminal is opened by a user;
instruct, in response to the synchronization request, an Internet of Things (IoT) terminal to synchronously open a second misdeletion prevention switch of the IoT terminal,
obtain a deletion request generated by a server, wherein the deletion request requests the server to delete data of the IoT terminal; and
refuse to respond to the deletion request based on synchronously opening the second misdeletion prevention switch based on the synchronization request.

20. A computer program product comprising computer-executable instructions that are stored on a non-transitory computer-readable medium and that, when executed by a processor, cause an apparatus to:
obtain, from a user terminal, a synchronization request when the user terminal detects that a first misdeletion prevention switch of user terminal is opened by a user;

instruct, in response to the synchronization request, an Internet of Things (IoT) terminal to synchronously open a second misdeletion prevention switch of the IoT terminal;

obtain a deletion request generated by a server, wherein the deletion request requests the server to delete data of the IoT terminal; and refuse to respond to the deletion request based on synchronously opening the second misdeletion prevention switch based on the synchronization request.

* * * * *

UNITED STATES PATENT AND TRADEMARK OFFICE
CERTIFICATE OF CORRECTION

PATENT NO. : 11,729,266 B2
APPLICATION NO. : 17/787459
DATED : August 15, 2023
INVENTOR(S) : Xiaoyang Chen et al.

It is certified that error appears in the above-identified patent and that said Letters Patent is hereby corrected as shown below:

In the Claims

Claim 3, Column 41, Line 14: "wherein the data of" should read "wherein deleting the data of"

Claim 5, Column 41, Line 23 and 24: "comprises: determining" should read "comprises determining"

Claim 6, Column 41, Line 26: "claim 5," should read "claim 5, further comprising:"

Signed and Sealed this
Tenth Day of October, 2023

Katherine Kelly Vidal
*Director of the United States Patent and Trademark Office*